US012322942B2

(12) United States Patent  
Cox

(10) Patent No.: US 12,322,942 B2  
(45) Date of Patent: Jun. 3, 2025

(54) RIGID BUS DUCTS

(71) Applicant: Martin Cox, Delta (CA)

(72) Inventor: Martin Cox, Delta (CA)

( * ) Notice: Subject to any disclaimer, the term of this patent is extended or adjusted under 35 U.S.C. 154(b) by 314 days.

(21) Appl. No.: 17/812,065

(22) Filed: Jul. 12, 2022

(65) Prior Publication Data

US 2023/0133170 A1    May 4, 2023

Related U.S. Application Data

(60) Provisional application No. 63/203,187, filed on Jul. 12, 2021.

(51) Int. Cl.  
*H02G 3/04*    (2006.01)  
*H02G 3/06*    (2006.01)

(52) U.S. Cl.  
CPC ......... *H02G 3/0437* (2013.01); *H02G 3/0608* (2013.01)

(58) Field of Classification Search  
None  
See application file for complete search history.

(56) References Cited

U.S. PATENT DOCUMENTS

| | | | |
|---|---|---|---|
| 895,362 A * | 8/1908 | Goldschmidt | H02B 1/20 174/68.2 |
| 4,291,195 A | 9/1981 | Blomqvist et al. | |
| 4,376,230 A | 3/1983 | Bargsten | |
| 4,702,444 A | 10/1987 | Beele | |
| 4,767,086 A | 8/1988 | Blomqvist | |
| 5,391,840 A | 2/1995 | Hughes et al. | |
| 5,665,939 A | 9/1997 | Jorgensen et al. | |
| 5,811,734 A * | 9/1998 | Ponsioen | H02G 5/066 174/68.2 |
| 5,992,802 A | 11/1999 | Campbell | |
| 6,590,154 B1 | 7/2003 | Badey et al. | |
| 6,706,969 B1 | 3/2004 | Young | |

(Continued)

FOREIGN PATENT DOCUMENTS

| | | |
|---|---|---|
| CA | 2965823 C | 2/2022 |
| CN | 102097771 A * | 6/2011 |

(Continued)

OTHER PUBLICATIONS

Office Action dated Jan. 2, 2019, issued by the USPTO on related U.S. Appl. No. 15/847,046.

(Continued)

*Primary Examiner* — Krystal Robinson  
(74) *Attorney, Agent, or Firm* — Borden Ladner Gervais; Richard A. Johnson

(57) ABSTRACT

A rigid bus duct comprising a pair of side rails extending in a longitudinal direction, a plurality of support members extending between the side rails in a transverse direction, and a plurality of insulated conductors extending longitudinally, and held in a fixed relationship to one another by the plurality of support members. The plurality of insulated conductors are arranged in groups including a plurality of high current phase groups and a neutral group, and a plurality of shielding structures connected between the support members and positioned with at least one shielding structure located between the insulated conductors of each high current phase group.

16 Claims, 31 Drawing Sheets

(56) References Cited

U.S. PATENT DOCUMENTS

| | | |
|---|---|---|
| 7,477,500 B2 | 1/2009 | Schmidt et al. |
| RE42,266 E | 4/2011 | Sparrowhawk |
| 8,193,448 B2 | 6/2012 | Syed |
| 8,294,030 B2* | 10/2012 | Pollard, Jr. .............. H02G 3/24 174/72 A |
| 9,059,575 B2 | 6/2015 | Pawluk |
| 9,202,610 B2* | 12/2015 | Gould ...................... H01B 3/00 |
| 10,305,263 B2* | 5/2019 | Cox ......................... H02B 1/20 |
| 10,554,024 B2 | 2/2020 | Cox et al. |
| 10,693,282 B2 | 6/2020 | Cox et al. |
| 10,903,630 B2 | 1/2021 | Cox et al. |
| 2007/0102184 A1* | 5/2007 | Lord ....................... F03D 80/85 174/68.2 |
| 2015/0255967 A1* | 9/2015 | Pawluk ................... H02B 1/20 174/38 |
| 2016/0050782 A1 | 2/2016 | Englert et al. |
| 2021/0143616 A1 | 5/2021 | Cox et al. |

FOREIGN PATENT DOCUMENTS

| | | |
|---|---|---|
| WO | 9953584 A1 | 10/1999 |
| WO | 2006076746 A1 | 7/2006 |
| WO | 2006097600 A1 | 9/2006 |
| WO | 2007006961 A1 | 1/2007 |
| WO | 2011146567 A2 | 11/2011 |
| WO | 2013142874 A1 | 9/2013 |

OTHER PUBLICATIONS

Office Action dated May 14, 2019, issued by the USPTO on related U.S. Appl. No. 16/381,911.

Examiner's Report dated Apr. 30, 2020, issued by the Canadian Intellectual Property Office on related Canadian patent application No. 2,965,823.

Examiner's Report dated Dec. 3, 2020, issued by the Canadian Intellectual Property Office on related Canadian patent application No. 2,965,823.

Office Action dated Aug. 18, 2022, issued by the USPTO on related U.S. Appl. No. 17/248,433.

* cited by examiner

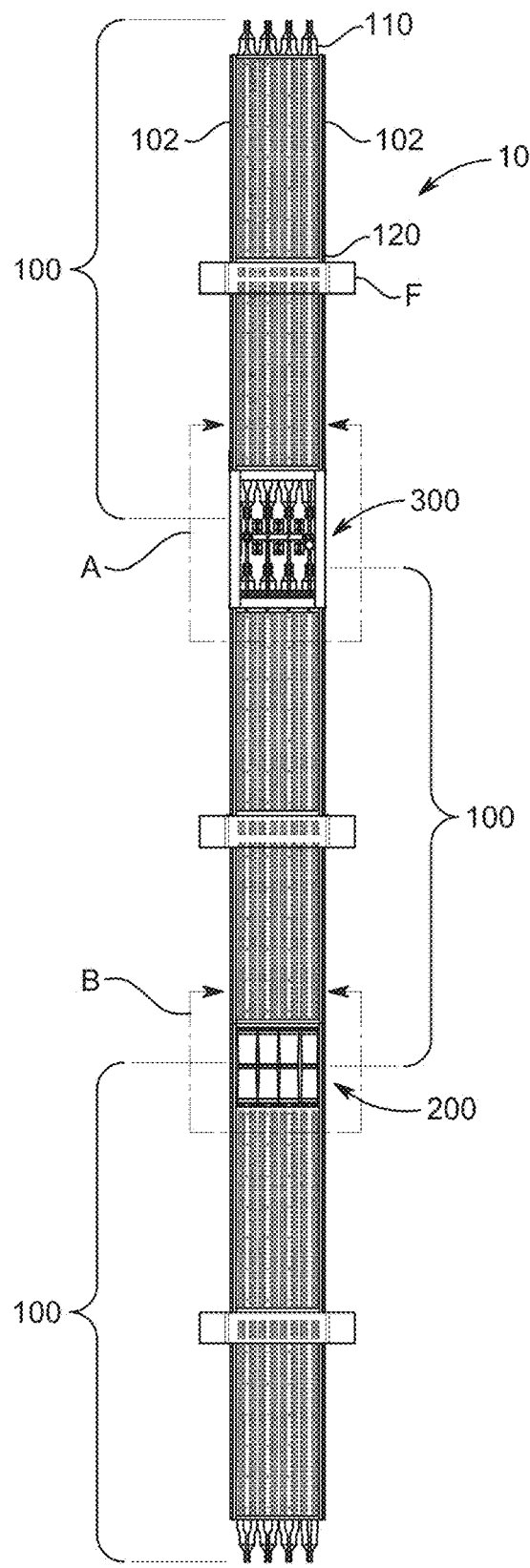
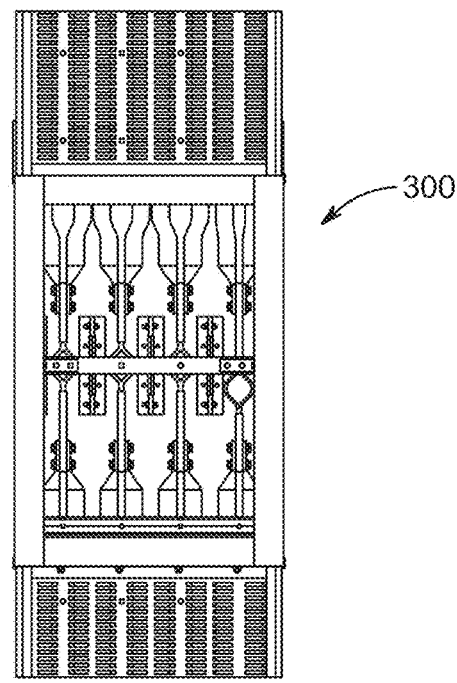
FIG. 1A
FIG. 1
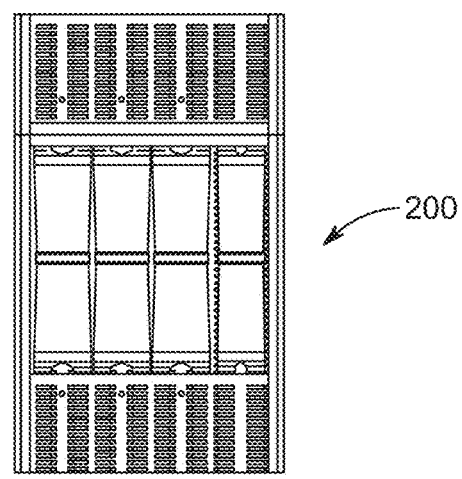
FIG. 1B

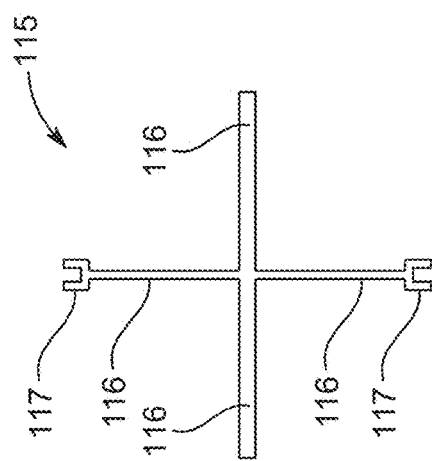
FIG. 2G
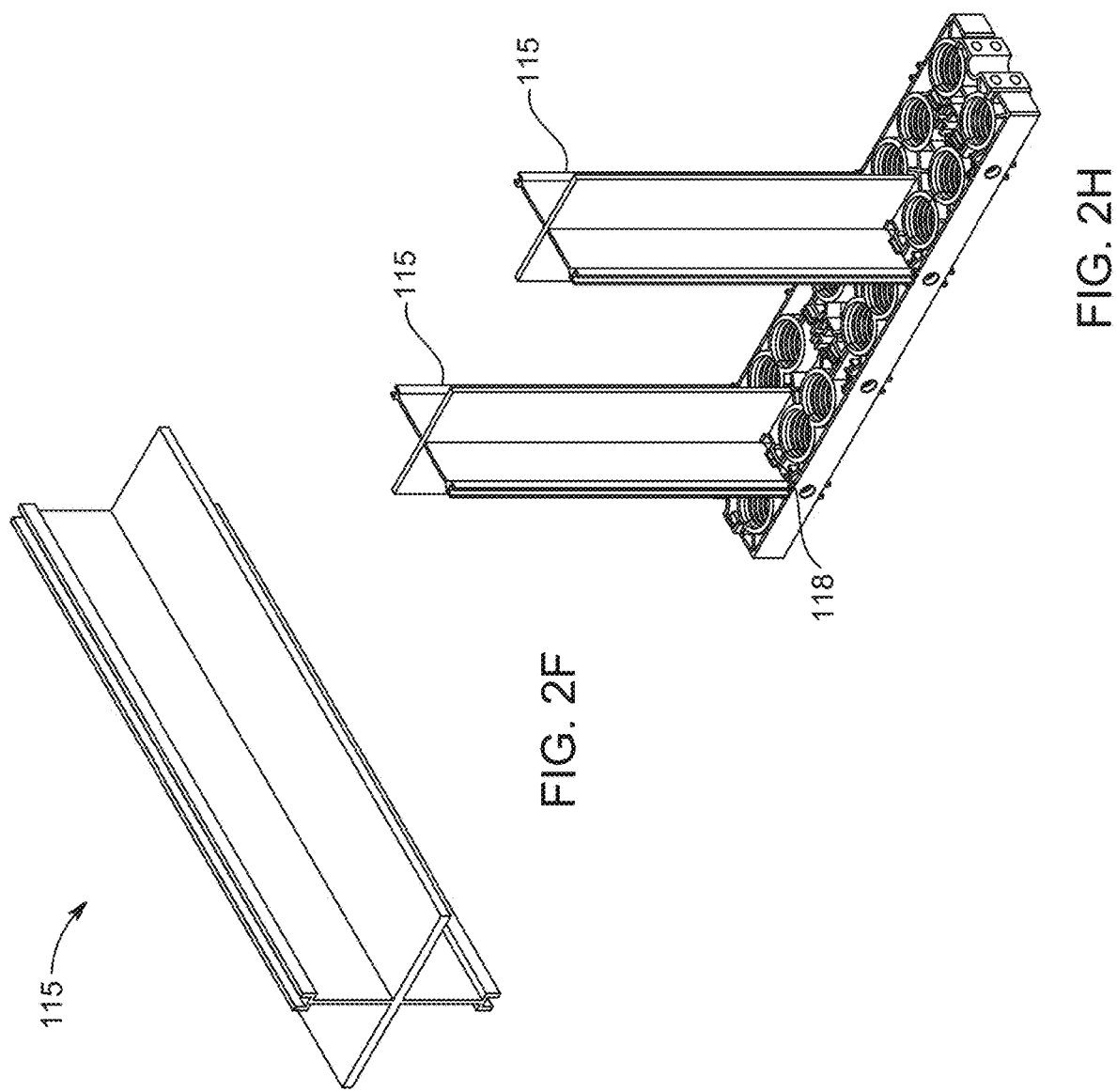
FIG. 2F
FIG. 2H

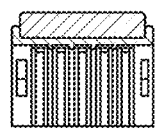
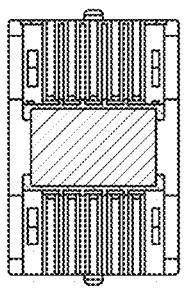
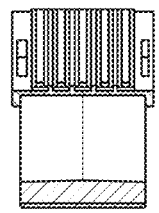
FIG. 3A
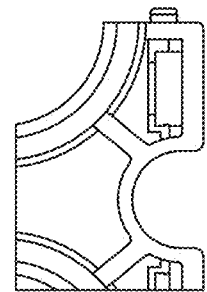
FIG. 3B
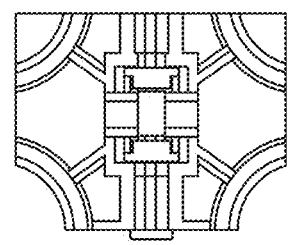
FIG. 3C
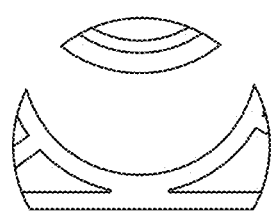
FIG. 3D

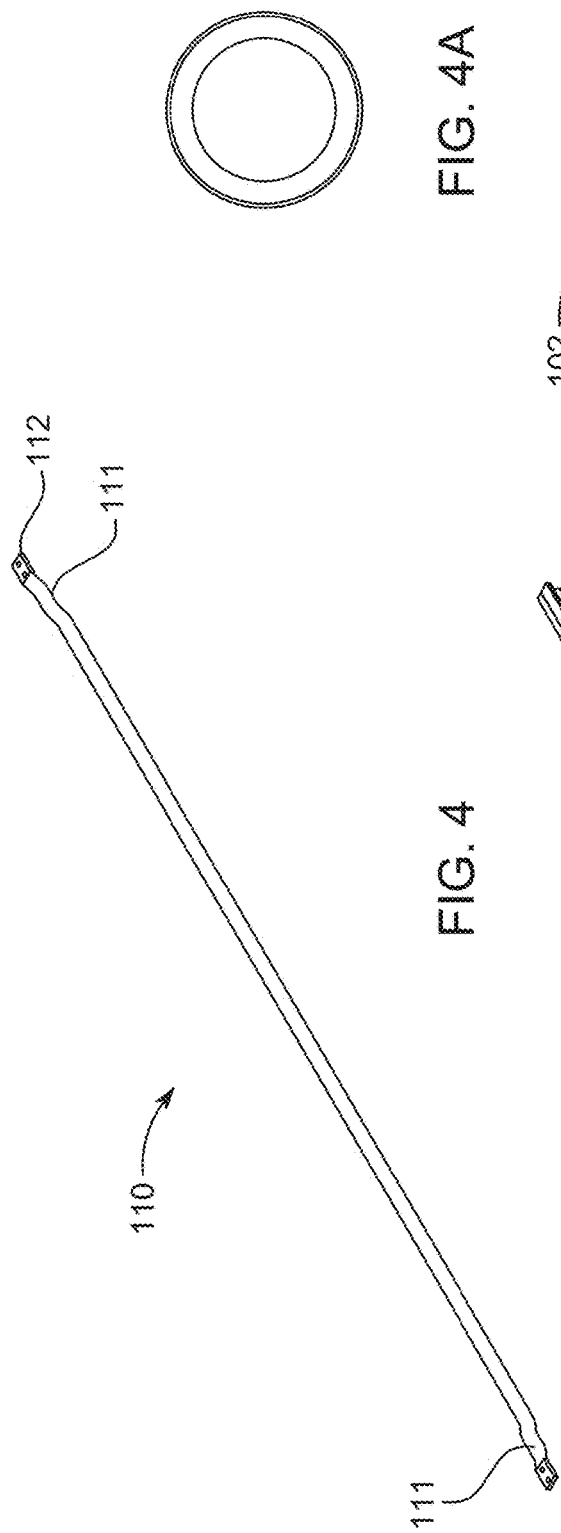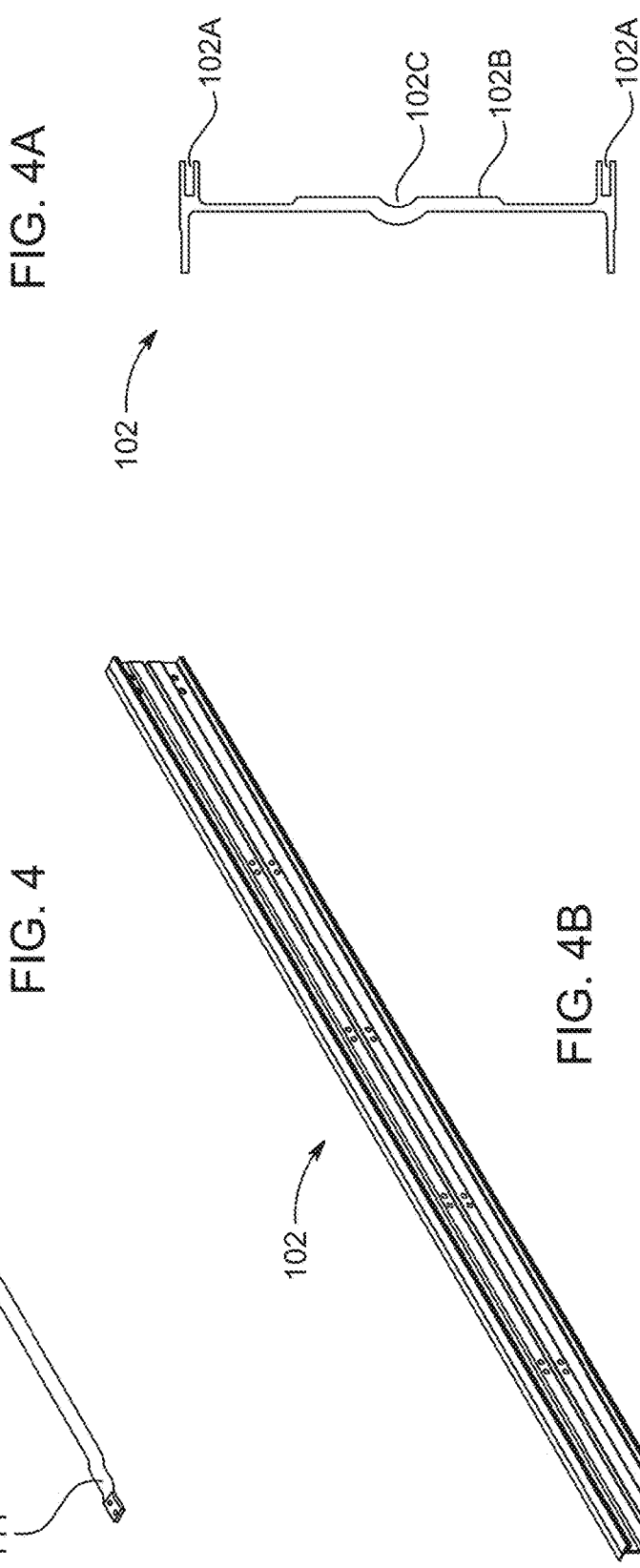

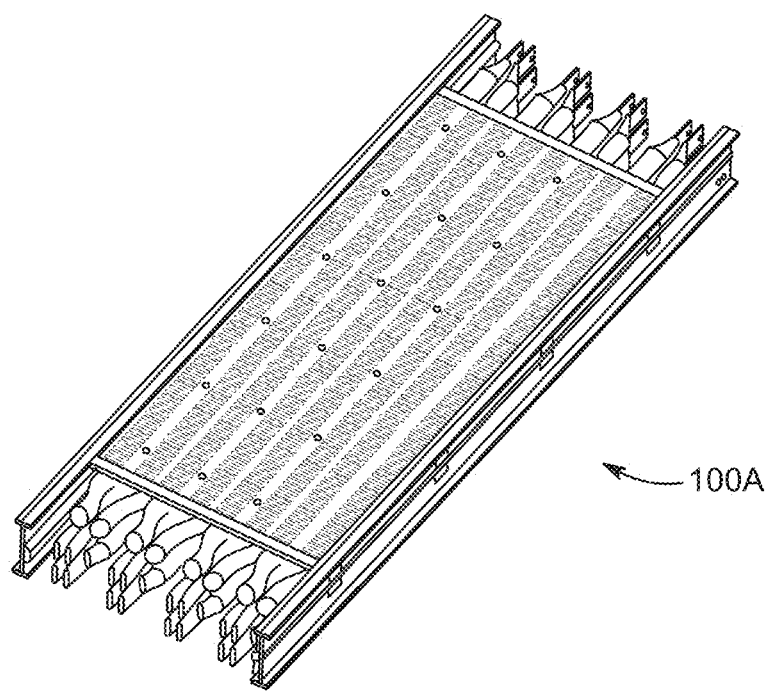
FIG. 7
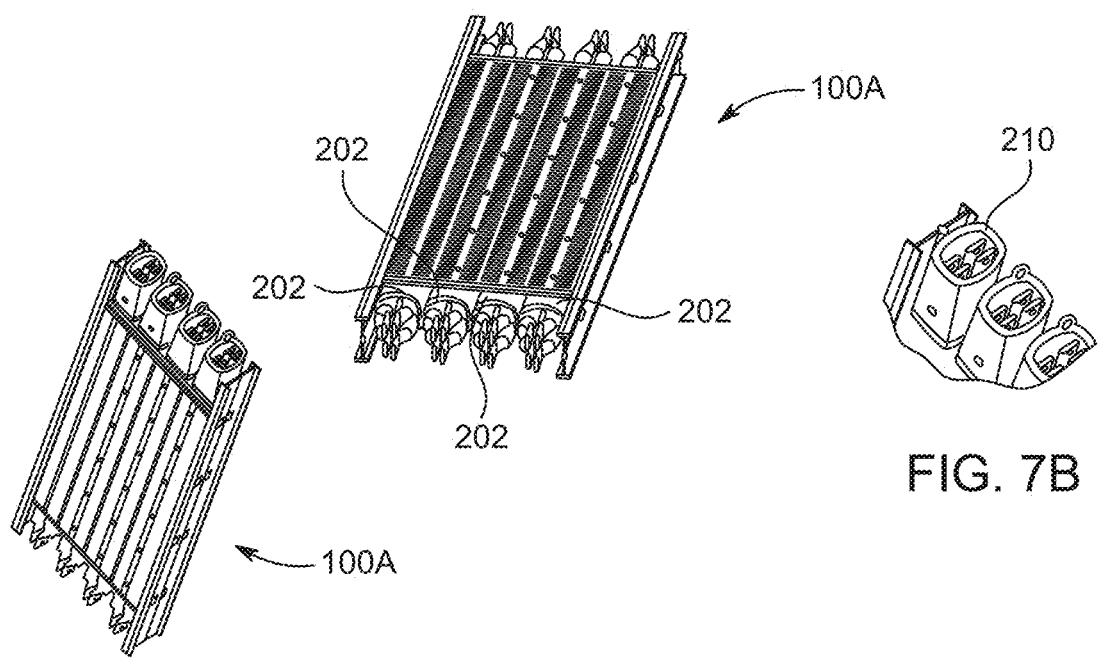
FIG. 7A
FIG. 7B

RIGID BUS DUCTS

CROSS REFERENCE TO RELATED APPLICATION

This application claims the benefit of priority of U.S. Provisional Patent Application No. 63/203,187 filed Jul. 12, 2021, which is hereby incorporated herein by reference in its entirety.

TECHNICAL FIELD

The present disclosure relates to rigid bus ducts. Particular embodiments relate to rigid bus duct systems adapted for supplying electrical power to high rise buildings and other multi-floored structures.

BACKGROUND

In multi-story structures such as office towers, condominiums, apartments, and other buildings, electrical power is typically distributed with the use of bus ducts which run vertically through multiple floors of the building. At various points along a vertical bus duct, connection points such as bus plugs are needed to tie in cables that distribute power throughout each floor. Depending on power requirements, construction details, and other factors at play in a building a bus duct may have connection points on every floor, every other floor, or any other desired pattern.

Most types of existing bus ducts are typically expensive and time consuming to install and replace. A typical bus duct has a number of rigid conductors, and these conductors must be securely connected at a joint between adjacent bus duct sections, often with a blade-type connection with bolts used to squeeze the conductors together. Such joints can present relatively high resistance, and some jurisdictions require that the bolts in the joints of a bus duct be re-torqued every six months. Further, due to seismic considerations, rigid bus ducts must typically be installed with their longer lateral sides oriented perpendicularly to a structural wall, such that the area footprint required for the bus duct can be significantly larger than the cross-sectional area of the bus duct itself.

U.S. Pat. Nos. 10,305,263, 10,554,024, 10,693,282 and 10,903,630 disclose electrical power supply structures which alleviate drawbacks of many types of traditional bus ducts. Such structures are suitable for supplying electrical power among multiple floors of buildings.

The inventor has determined a need for further improvements to structures and systems for distribution of electrical power in multi-story buildings.

SUMMARY

One aspect of the present disclosure provides a rigid bus duct comprising a pair of side rails extending in a longitudinal direction, a plurality of support members extending between the side rails in a transverse direction, and a plurality of insulated conductors extending longitudinally, and held in a fixed relationship to one another by the plurality of support members. The plurality of insulated conductors are arranged in groups including a plurality of high current phase groups and a neutral group, and a plurality of shielding structures connected between the support members and positioned with at least one shielding structure located between the insulated conductors of each high current phase group.

In some embodiments the insulated conductors comprise hollow tubes. In some embodiments the insulated conductors comprise sixteen insulated conductors held within passages through the support members arranged in two rows of eight, with each high current phase group and the neutral group comprising two adjacent pairs of insulated conductors, and wherein each shielding structure has a cross-shaped cross-section. In some embodiments a center-to-center spacing between two adjacent passages in the same row for holding insulated conductors of the same high current phase group is greater than a center-to-center spacing between two adjacent passages in the same row for holding insulated conductors of different high phase groups. In some embodiments the shielding structures are held in place between the support members by engagement features formed on opposed faces of each support member. In some embodiments the bus duct comprises a pair of covers extending between the side rails to form an enclosure enclosing the support members, insulated conductors, and shielding structures, and each cover is held in place by fasteners received in the shielding structures.

Another aspect of the present disclosure provides a rigid bus duct system comprising a plurality of bus duct sections, each bus duct section comprising a pair of side rails extending in a longitudinal direction, a plurality of support members extending between the side rails in a transverse direction, and a plurality of insulated conductors extending longitudinally, and held in a fixed relationship to one another by the plurality of support members. The rigid bus duct system is characterized in that each insulated conductor comprises a hollow tube, and the plurality of insulated conductors are arranged in groups including a plurality of high current groups and a neutral group, and adjacent insulated conductors in different high current phase groups are separated by a smaller distance than adjacent insulated conductors in the same high current phase group.

Another aspect of the present disclosure provides apparatus for forming a sealed connection between two bus duct sections of a rigid bus duct system, wherein each bus duct section comprises a plurality of insulated conductors are arranged in groups including a plurality of high current groups and a neutral group, the apparatus comprising a pair of sealing boots for each group of insulated conductors. Each boot comprises a body constructed from a flexible material and having a closed first end and an open second end, with an opening through the closed end for each insulated conductor such that the open end of one boot of each pair is stretchable over the open end of the other boot of each pair to form a seal around a connection between each group of insulated conductors.

Further aspects of the present disclosure and details of example embodiments are set forth below.

DRAWINGS

The following figures set forth embodiments in which like reference numerals denote like parts. Embodiments are illustrated by way of example and not by way of limitation in the accompanying figures.

FIG. 1 shows a rigid bus duct system according to one embodiment of the present disclosure.

FIG. 1A shows an enlarged view of area A of FIG. 1.

FIG. 1B shows an enlarged view of area B of FIG. 1.

FIG. 2F shows an example shielding structure according to one embodiment of the present disclosure.

FIG. 2G is an end view of the shielding structure of FIG. 2F.

FIG. 2H shows shielding structures coupled to a transverse support member of a rigid bus duct according to one embodiment of the present disclosure.

FIG. 3A is a sectional view along line A-A of FIG. 3.

FIG. 3B is an enlarged view of area B of FIG. 3.

FIG. 3C is an enlarged view of area C of FIG. 3.

FIG. 3D is an enlarged view of area D of FIG. 3.

FIG. 4 shows an example insulated conductor of a rigid bus duct according to one embodiment of the present disclosure.

FIG. 4A is a transverse sectional view through the insulated conductor of FIG. 4.

FIG. 4B shows an example side rail of a rigid bus duct section according to one embodiment of the present disclosure.

FIG. 4C is a transverse sectional view through the side rail of FIG. 4B.

FIG. 7 shows a rigid bus duct section configured for making a sealed connection to another rigid bus duct section according to one embodiment of the present disclosure.

FIGS. 7A-7G show steps of an example method of making a sealed connection between two rigid bus duct sections.

DETAILED DESCRIPTION

Figure 1C:
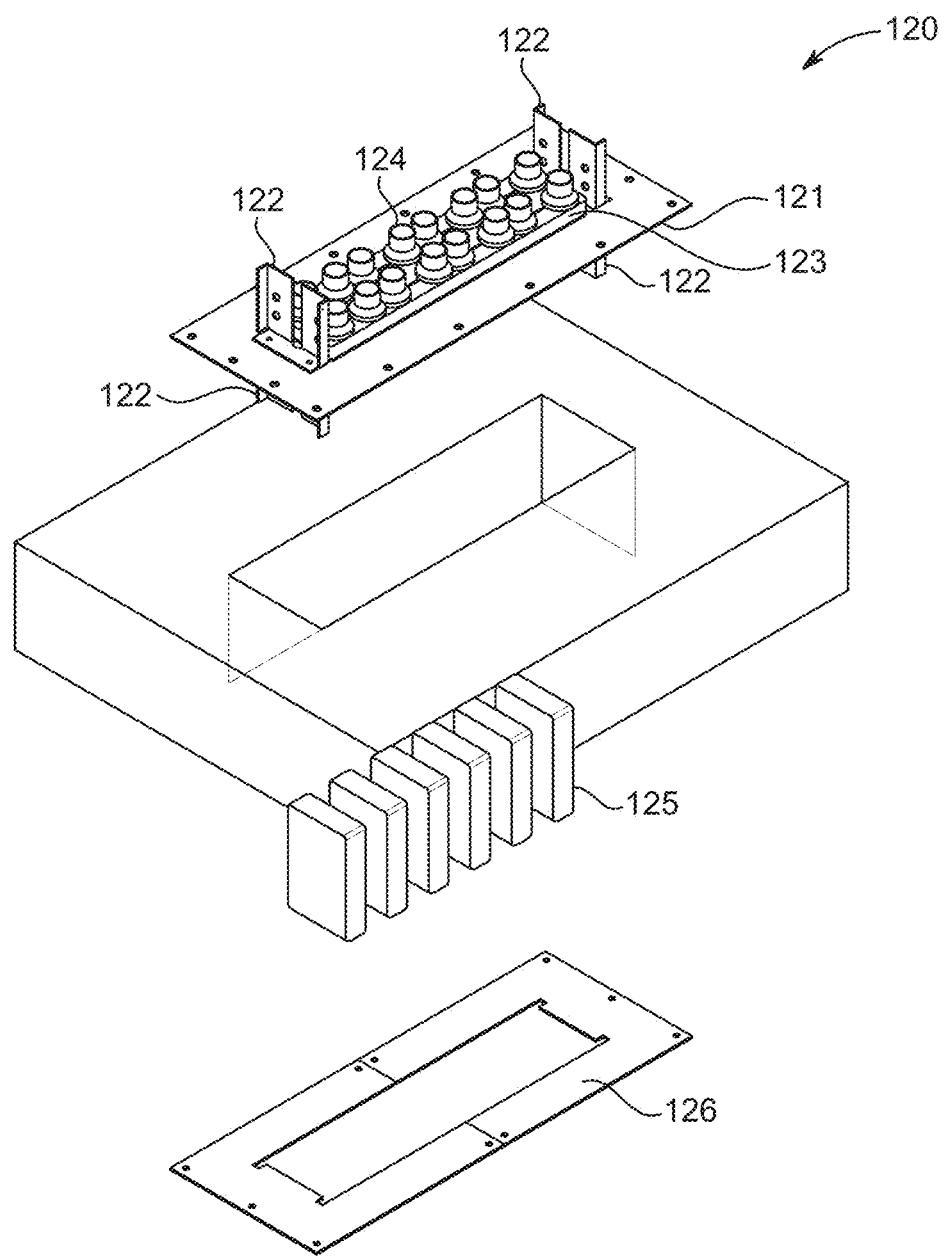
FIG. 1C is an exploded view of components of a floor seal assembly for mounting a rigid bus duct in a hole in a floor of a building.
Figure 1D:
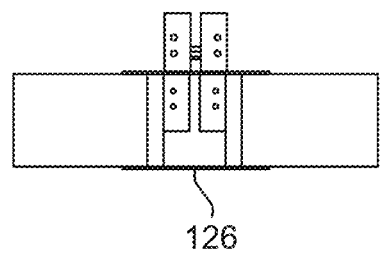
FIG. 1D is a side view of a floor seal assembly with a flat backing plate according to one embodiment of the present disclosure.
Figure 1E:
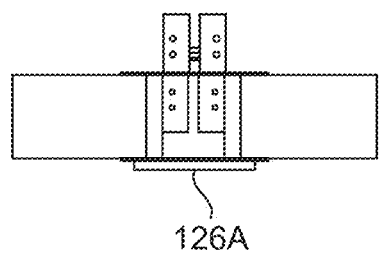
FIGS. 1E and 1F are side views of floor seal assemblies with offset backing plates according to other embodiments of the present disclosure.
Figure 1F:
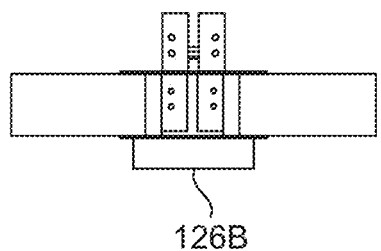

The following describes rigid bus duct systems for supplying electrical power to high-rise buildings or other structures where high current power needs to be distributed throughout a number of floors, or through walls or other barriers. Unlike many traditional bus ducts that must be de-rated if mounted in suboptimal positions, bus duct systems constructed according to certain embodiments of the present disclosure, and rigid bus duct sections thereof, are configured to be installed in any position without needing to be de-rated. As discussed below, the bus duct sections according to example embodiments provide an irregularly spaced array of hollow insulated conductors held in relative positions carefully selected to optimize performance, and an enclosure designed to reduce weight, allow airflow for cooling, and minimize hysteresis and eddy current losses.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows a rigid bus duct system 10 according to one embodiment of the present disclosure. The system 10 comprises a plurality of rigid bus duct sections 100 connected end to end, either directly by sealed connections 200 (FIG. 1B) or through junction boxes 300 (FIG. 1A), to supply electrical power to a structure, such as for example a high rise building or large industrial installation. The bus duct sections 100 of the example embodiments shown in the Figures are depicted as passing through floors F and are thus vertically oriented, but it is to be understood that the sections 100 could be differently oriented and pass through walls or other barriers.

Figure 2:
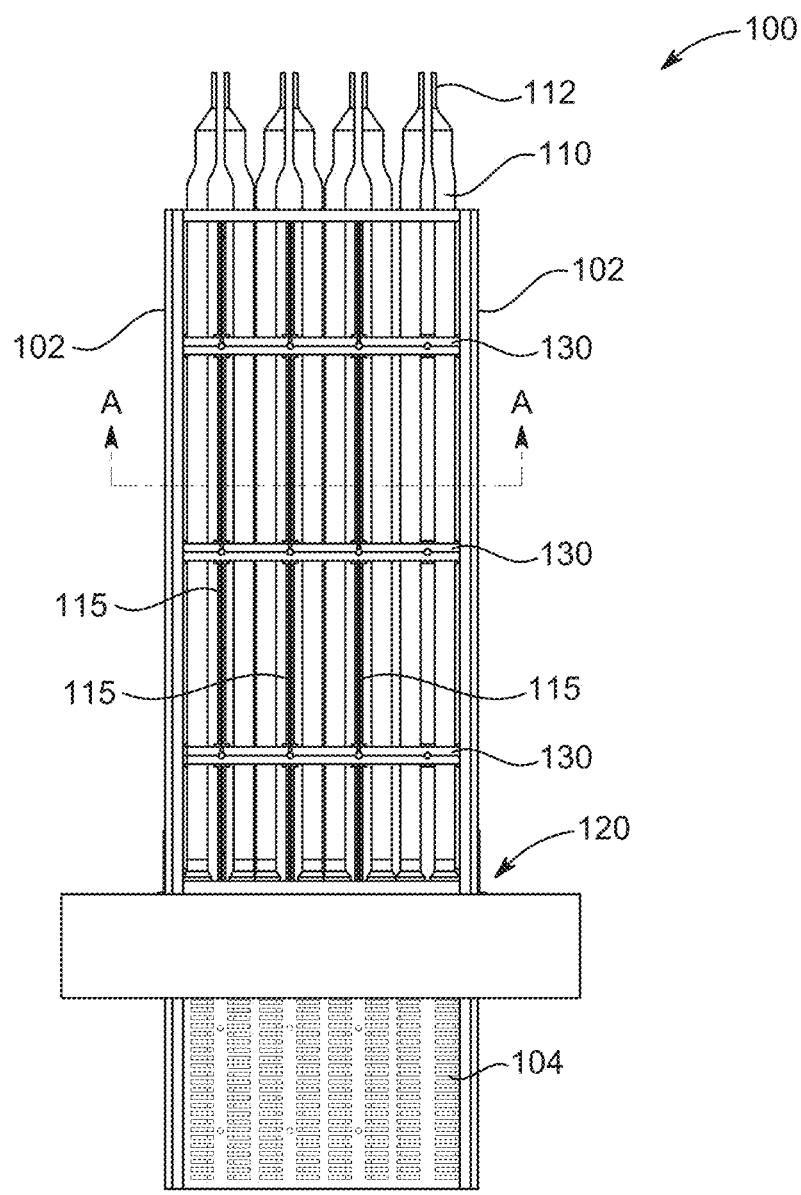
FIG. 2 shows a portion of a rigid bus duct extending through a hole in a floor of a building.

Each bus duct section 100 comprises a pair of opposed side rails 102 extending longitudinally, with a pair of "front" and "back" (or "top" and "bottom", depending on the orientation of the section 100) covers 104 extending between the rails 102 to form a longitudinal enclosure for a plurality of insulated conductors 110. FIG. 2 shows a portion of a rigid bus duct section 100 extending through a hole in a floor of a building, with a cover 104 removed to show the internal structure thereof. The conductors 110 are held in place by transverse support members 130, and arranged in a plurality of high current phase groups and a neutral group with relative spacings therebetween selected to optimize performance, as discussed further below. In some embodiments a shielding structure 115 is located between the insulated conductors of each high current phase group. The shielding structures 115 are held in place between adjacent support members 130, for example by grooves or other features on the support members 130, as described below. The bus duct section 100 may also comprise ground cables 119 (see FIG. 2B) running along the inside of each rail 102.

In the illustrated examples, each insulated conductor 110 comprises a pipe or tube, for example an extruded aluminum pipe with a hollow center, covered with a layer of insulation, as seen in FIGS. 4 and 4A, and has a bent portion 111 and lug 112 formed at either end thereof. Each rail 102 may also comprise an extruded piece of aluminum of a desired length. Each rail 102 may have a plurality of holes drilled therein as shown in FIG. 4B for facilitating attachment to the support members 130, and optionally also to stubs 122 of a floor seal assembly 120 as described below. FIG. 4C shows a cross-sectional view through an example rail 102, which has a generally "I"-shaped cross section and comprises grooves 102A formed on one side of the top and bottom flanges of the I for receiving edges of covers 104. The rail 102 also has a thicker central portion 102B where central blocks 131 of the support members 130 are to be attached, as described below, with an indent 102C running along the inside thereof to accommodate a ground cable 119.

In the example shown in FIG. 1, each bus duct section 100 comprises two pairs of rails 102 (each with their own pair of covers 104), with one pair of rails 102 extending upwardly from a floor seal assembly 120, and one pair of rails 102 extending downwardly from the floor seal assembly 120, with the conductors 110 running continuously through the entire length thereof. In other embodiments, depending on the building or other structure and the desired installation (e.g. where a section does not need to pass through a floor), some bus duct sections may not have a floor seal assembly, and only comprise a single pair of rails extending the entire length thereof.

Details of an example floor seal assembly 120 are shown in FIG. 1C, in relation to an opening through a floor, but it is to be understood that assembly 120 could also be used for passing a bus duct section 100 through an opening in a wall or other barrier. The floor seal assembly 120 comprises a floor seal plate 121 having a pair of stubs 122 extending from each side thereof. The stubs 122 are configured to engage with the side rails 102, and may have pre-drilled holed for facilitating attachment of rails 102. A seal block 123 extends across an opening through the plate 121 between the stubs 122. The seal block 123 has a plurality of holes therethrough for receiving the plurality of insulated conductors 110, each hole being fitted with a water seal 124 sized to fit snugly around an insulated conductor 110. A plurality of firestop pillows 125 are packed around and between the conductors 110 within the opening through the floor, and a backing plate 126 is attached to the underside of the floor around the opening. In some embodiments, for example when the floor/wall is less than a predetermined thickness (e.g. 9 inches), an offset backing plate 126A/126B (See FIGS. 1E and 1F) is attached to the underside of the floor, to accommodate the firestop pillows 125. A rubber gasket or butyl sealant may be used at the interface(s) between the floor and the floor seal plate 121 and/or backing plate 126/126A/126B to ensure a weatherproof seal.

Figure 2A:
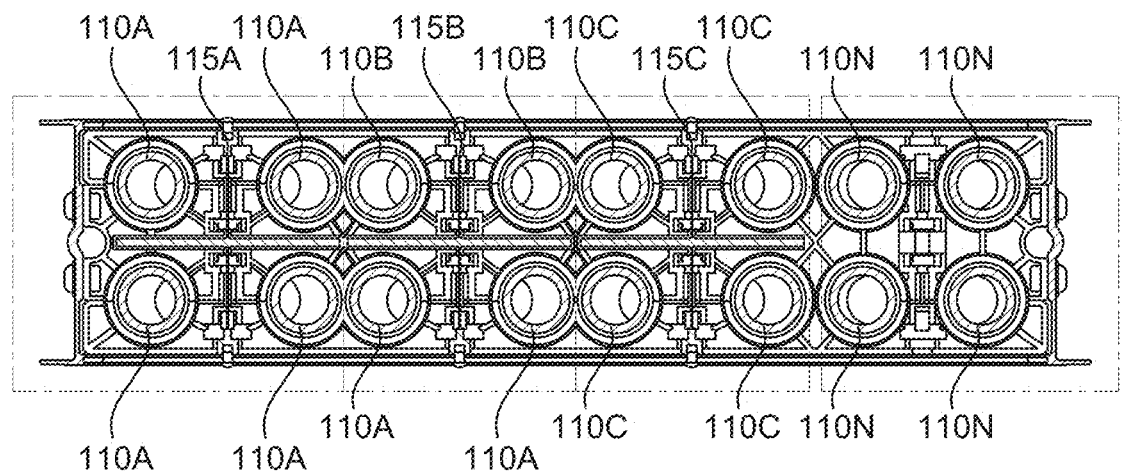
FIG. 2A is a sectional view along line A-A of FIG. 2.
Figure 2B:
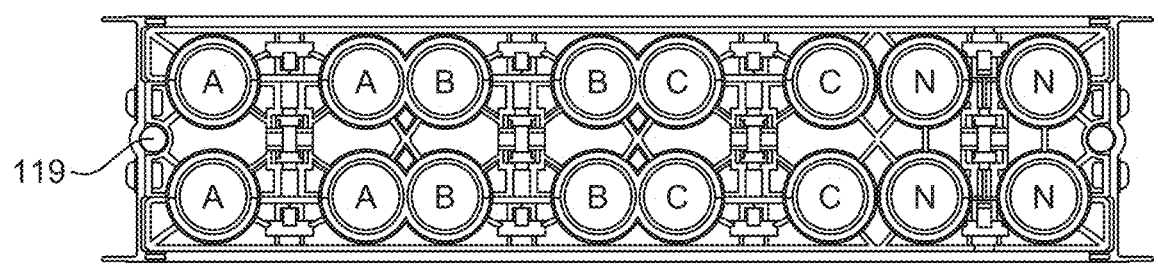
FIG. 2B is a view similar to FIG. 2A with the insulated conductors removed, showing the phase arrangement and the relative spacing between passages formed by the transverse support members of an example rigid bus duct.

As best seen in FIGS. 2A and 2B, the insulated conductors 110 are arranged in a plurality of high current phase groups (three phases in the illustrated embodiment, with conductors 110A in the first phase group, conductors 110B in the second phase group, and conductors 110C in the third phase group) and a neutral group (conductors 110N). A shielding structure 115A/115B/115C is held in place between the conductors 110A/110B/110C of each high current phase group. The conductors 110 are not all evenly spaced, but instead adjacent insulated conductors in different high current phase groups are separated by a smaller distance than adjacent insulated conductors in the same high current phase group. FIG. 2B shows the phase arrangement and the relative spacing between passages formed by the transverse support members of an example rigid bus duct, with each passage labelled with a letter (A, B, C, or N) indicating which group the conductor held within is to belong to. The passages are arranged in two rows, with the passages of the "top" and "bottom" rows aligned such that each passage has an adjacent paired passage in the other row. The spacing between adjacent pairs of passages in different rows is uniform (e.g. 3 inches in the embodiment shown in FIG. 2B), but the spacing between adjacent passages in the same row differs depending on whether the passages hold conductors the same group or in different groups. As indicated by the example dimensions shown in FIG. 2B, the center-to-center spacing of between two adjacent passages in the same row for holding insulated conductors of the same high current phase group (e.g. 4 inches in the embodiment shown in FIG. 2B) is twice that of the center-to-center spacing between two adjacent passages in the same row for holding insulated conductors of different high current phase groups (e.g. 2 inches in the embodiment shown in FIG. 2B). Further, in some embodiments, each set of two adjacent passages for holding insulated conductors of different high current phase groups are each formed by a single feature formed in an interfacial surface of each of a central block and a top/bottom block of the support member 130, as described further below with reference to FIG. 3.

The phase arrangement and spacing of the hollow insulated conductors 110 provides bus duct sections 100 according to certain embodiments of the present disclosure with increased thermal efficiency and reduced electromagnetic interference than traditional bus ducts using adjacent flat conductors. The shielding structures 115 can provide further reduction of interference, such that certain embodiments may provide, for example, up to 25% less voltage drop than a traditional bus duct. Bus duct systems according to certain embodiments of the present disclosure can have a length up to 70% longer than certain prior art busways carrying the same amount of current.

Figure 2C:
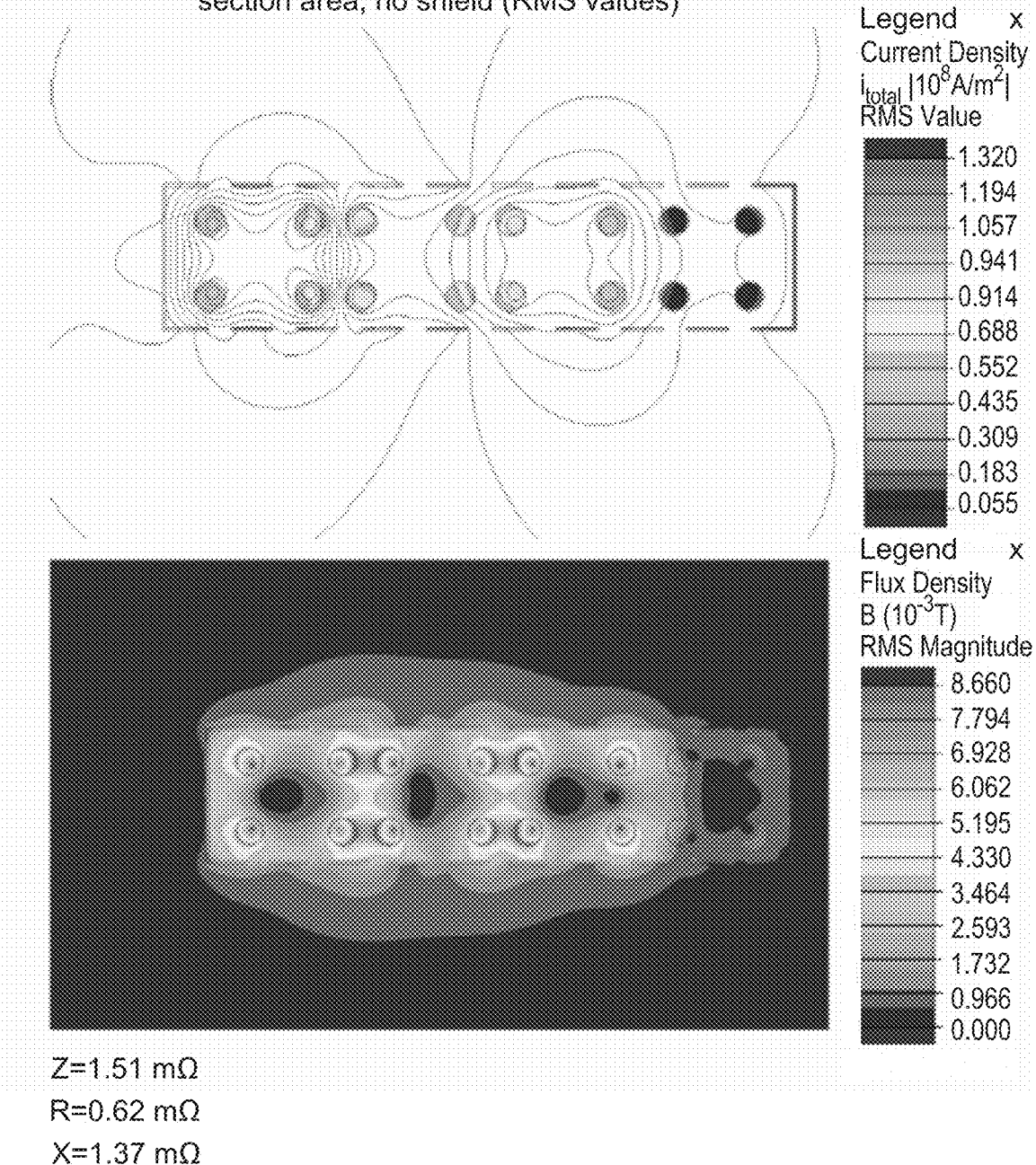
FIG. 2C shows sectional views through an example rigid bus duct with solid conductors showing current density (top graph) and flux density (bottom graph) when carrying 1500 A.
Figure 2D:
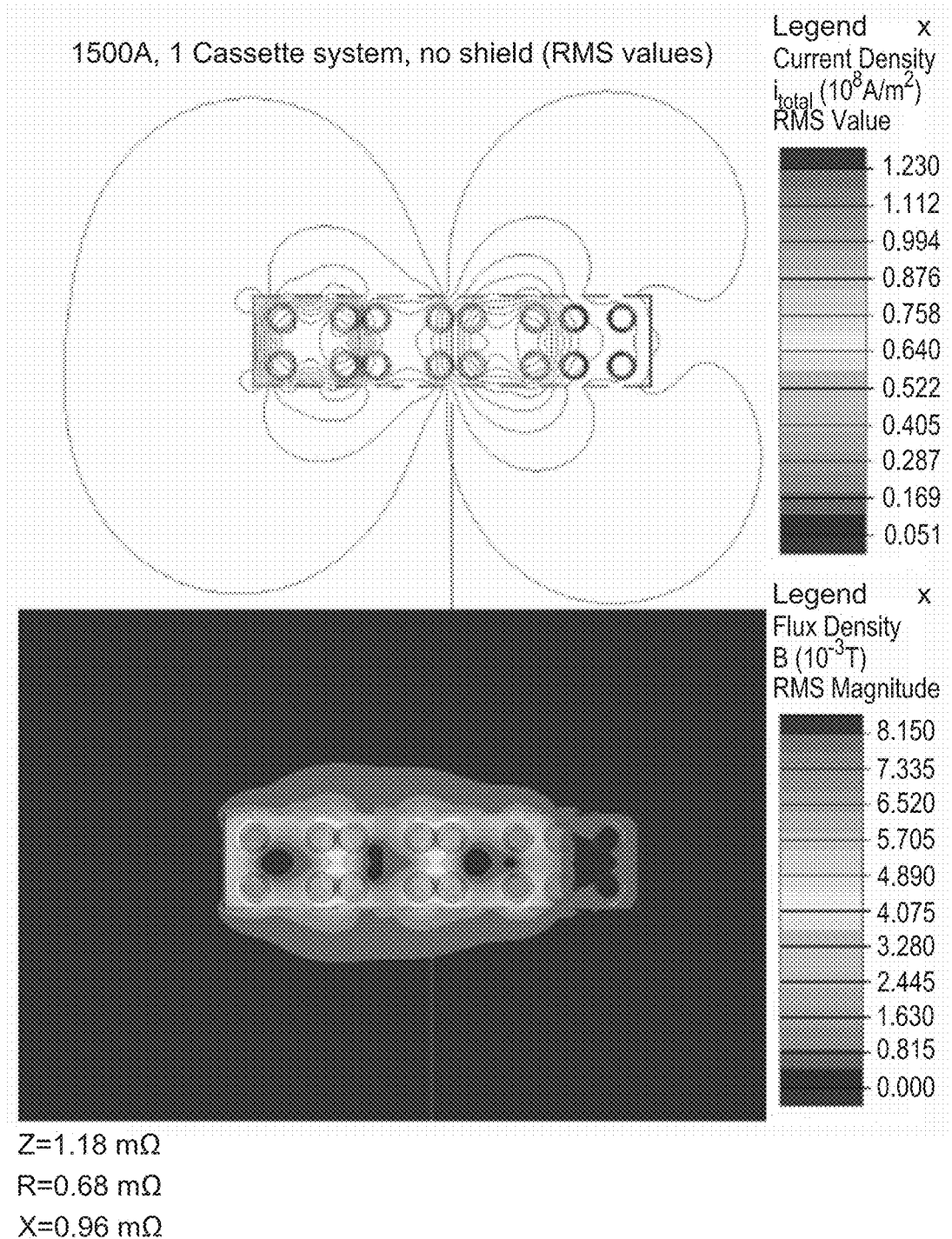
FIG. 2D shows sectional views through an example rigid bus duct with hollow conductors according to one embodiment the present disclosure showing current density (top graph) and flux density (bottom graph) when carrying 1500 A.
Figure 2E:
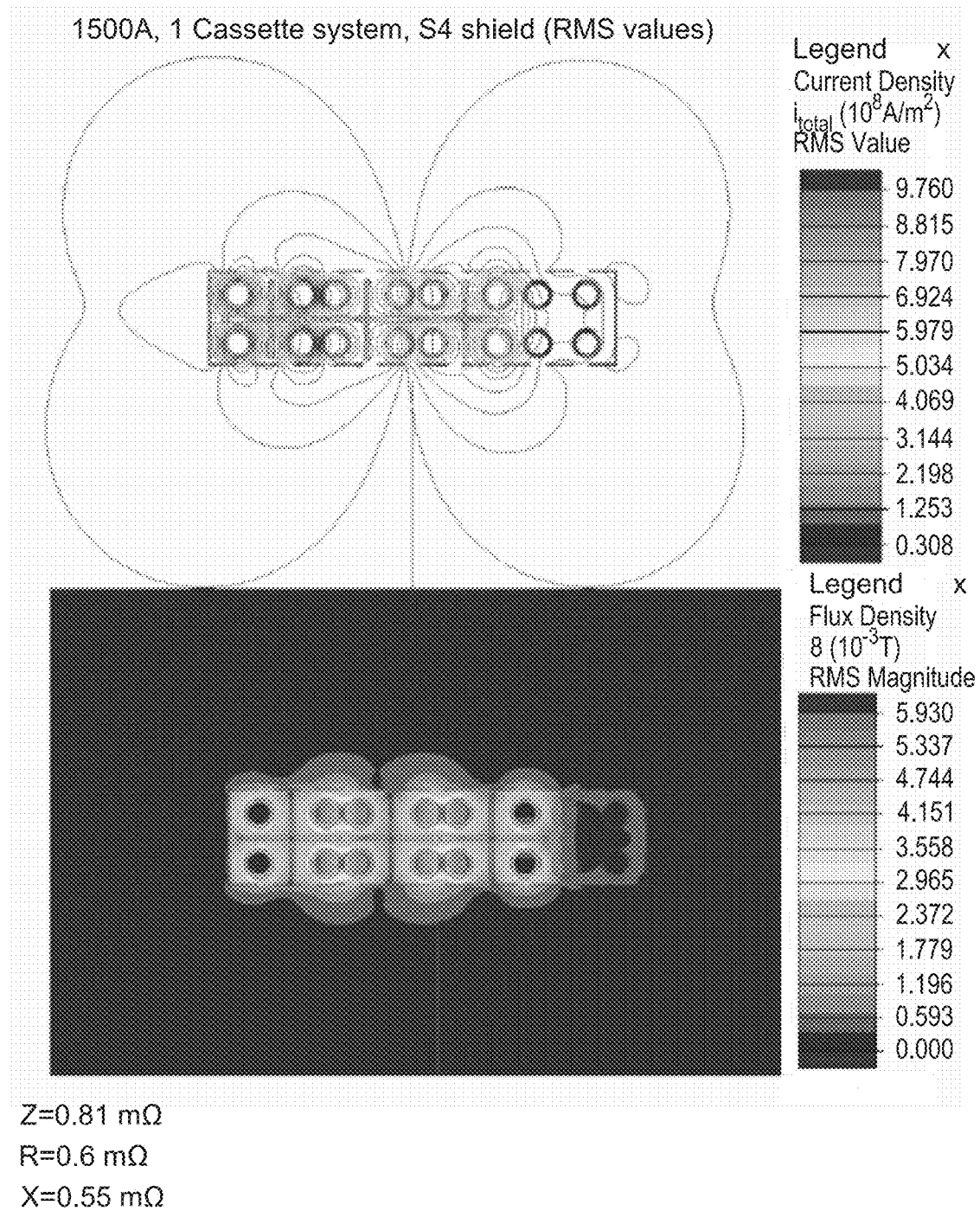
FIG. 2E shows sectional views through an example rigid bus duct with hollow conductors and shielding structures according to another embodiment of the present disclosure showing current density (top graph) and flux density (bottom graph) when carrying 1500 A.

FIGS. 2C, 2D and 2E each show a finite element analysis (FEA) of sectional views through simulated bus ducts with a phase arrangement as shown in FIG. 2B when carrying 1500 A. In each of FIGS. 2C, 2D, and 2E the top graph illustrates current density and the bottom graph illustrates flux density. FIG. 2C shows results for bus ducts with solid conductors, FIG. 2D shows results for bus ducts with hollow conductors, and FIG. 2E shows results for bus ducts with hollow conductors and a shielding structure located between the conductors in each high phase group. As shown by the bottom graphs, the magnetic flux density between and around adjacent high current phase groups of different groups (which are placed closest to one another) is relatively high for solid conductors (FIG. 2C), but is reduced when using hollow conductors (FIG. 2D) and further reduced when using the shielding structures (FIG. 2E). Impedance (Z) is also reduced when using hollow conductors (Z=1.18 mΩ; R=0.68 mΩ; X=0.96 mΩ) as compared to the solid conductors (Z=1.51 mΩ; R=0.62 mΩ; X=1.37 mΩ), and is even further reduced when using hollow conductors with shielding structures positioned according to the present disclosure (Z=0.81 mΩ; R=0.6 mΩ; X=0.55 mΩ).

Figure 2K:
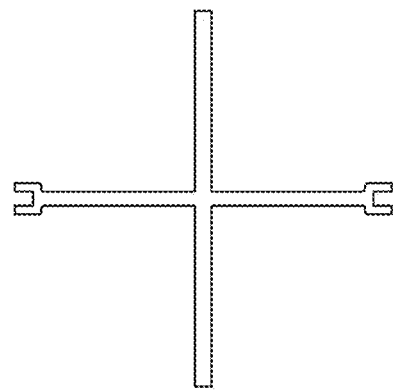
FIGS. 2J and 2K are end views of shielding structures with different thicknesses.
Figure 2I:
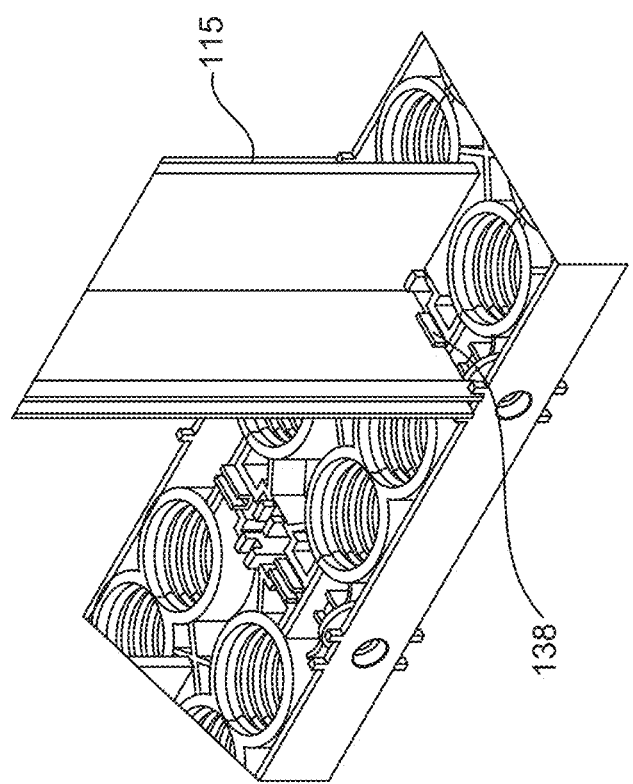
FIG. 2I is an enlarged view of area B of FIG. 2H.
Figure 2J:
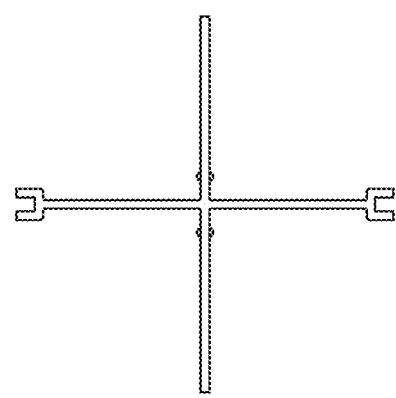

FIGS. 2F and 2G show an example shielding structure 115 according to one embodiment of the present disclosure. The shielding structure 115 comprises an extruded elongated element of aluminum (or other suitable electrically conductive material) having a generally cross-shaped cross section, with four arms 116 comprising generally planar sheets or plates oriented at right angles. Two of the opposed arms 116 are formed with threaded connections 117 along the edges thereof for receiving bolts for securing covers 104 thereto. As the covers 104 and rails 102 are constructed from conductive material (aluminum in preferred embodiments), and grounded (e.g. by ground cables 119 running along the insides of the rails 102), the shielding structures 115 are also thus connected to ground. As shown in FIGS. 2H and 2I, each shielding structure 115 is engaged by grooves 138 (see also FIG. 3E) formed in opposed faces of the central blocks 131 of the support members 130 to stabilize the shielding structures 115. (Only two shielding structures 115 are shown in FIG. 2H, but it is to be understood that another shielding structure 115 would be placed between the two shown.) In some embodiments, thinner or thicker shielding structures 115 may be provided, as shown in FIGS. 2J and 2K, depending on the desired amount of shielding.

Figure 3:
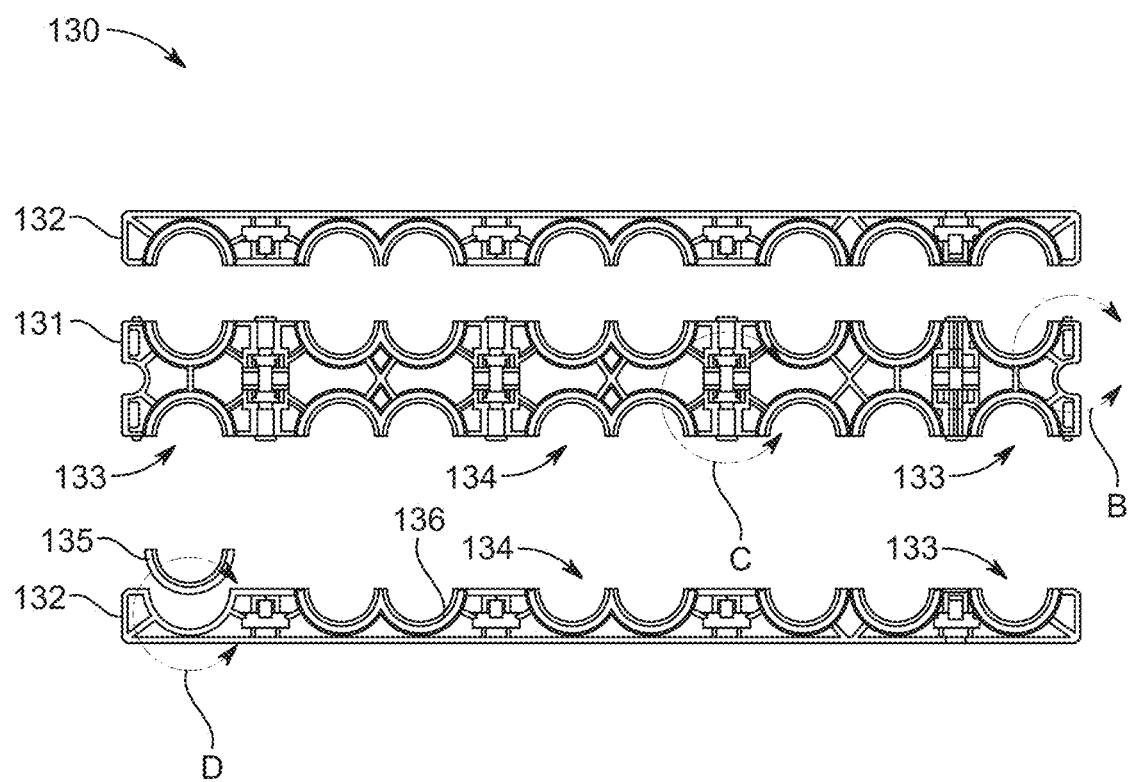
FIG. 3 is an exploded view of a transverse support member for a rigid bus duct according to one embodiment of the present disclosure.
Figure 3E:
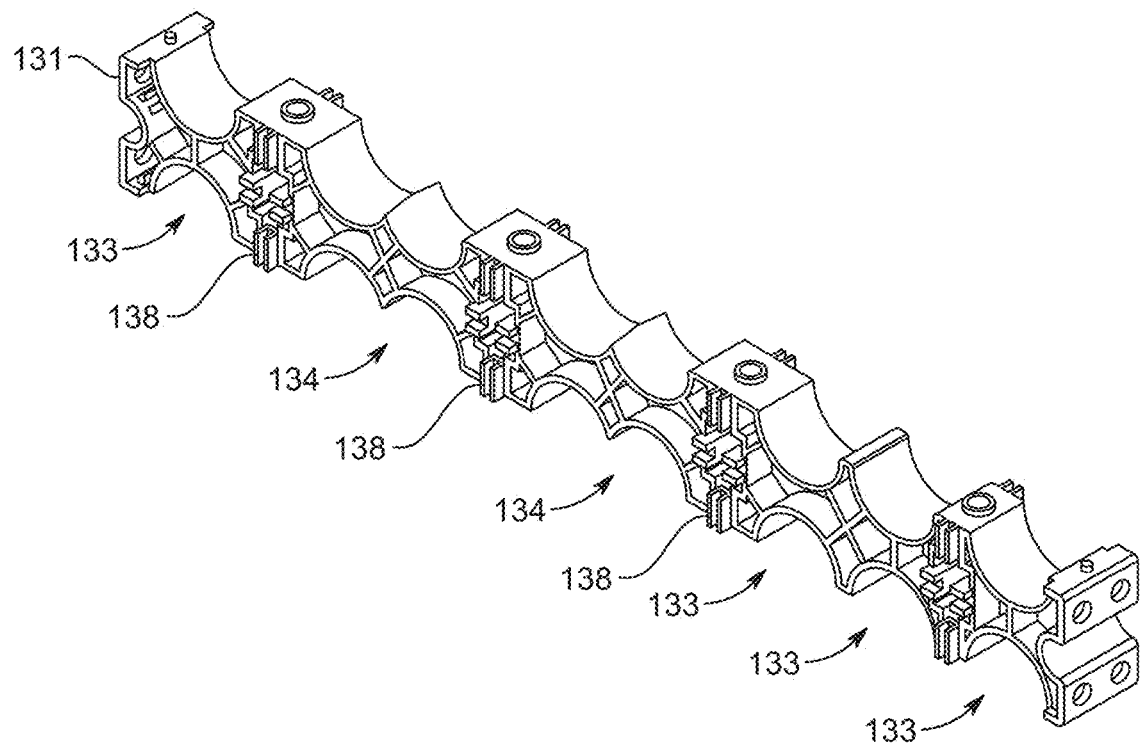
FIG. 3E shows a central block of the transverse support member of FIG. 3 in isolation.
Figure 3F:
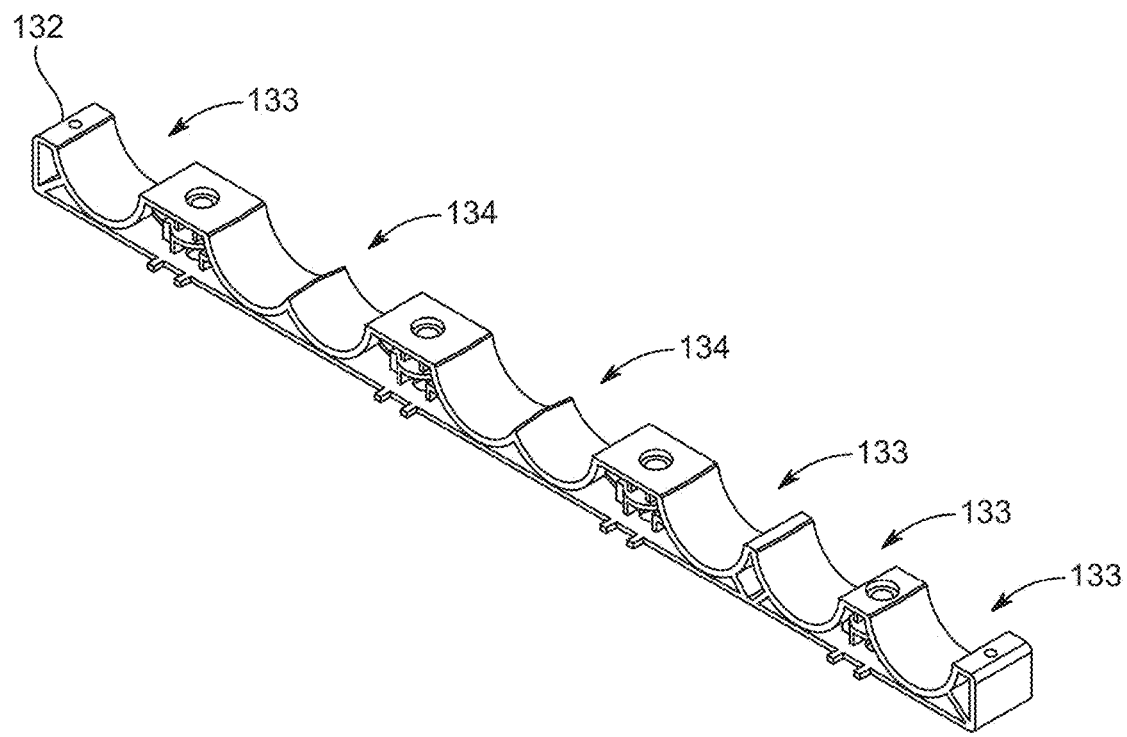
FIG. 3F shows a top/bottom block of the transverse support member of FIG. 3 in isolation.
Figure 3G:
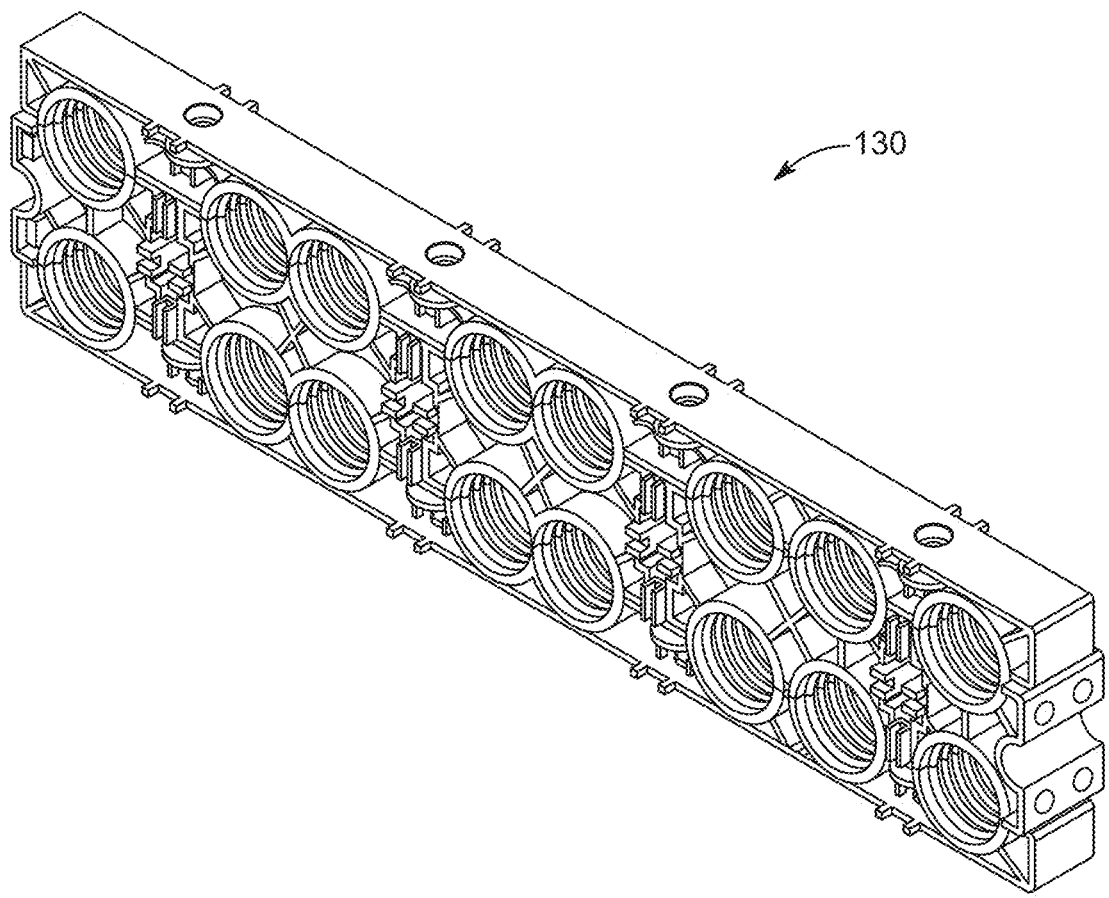
FIG. 3G shows the transverse support member of FIG. 3 in an assembled state.
Figure 3H:
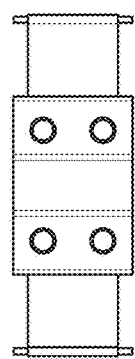
FIG. 3H is a side view of the transverse support member of FIG. 3G.
Figure 3I:
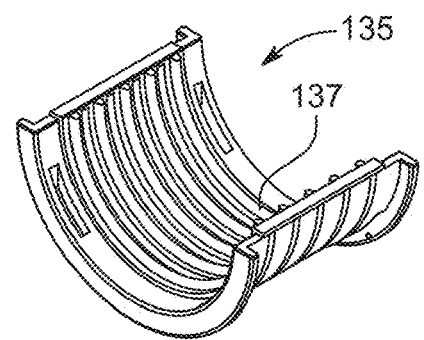
FIG. 3I shows a single-passage bushing of the transverse support member of FIG. 3 in isolation.
Figure 3J:
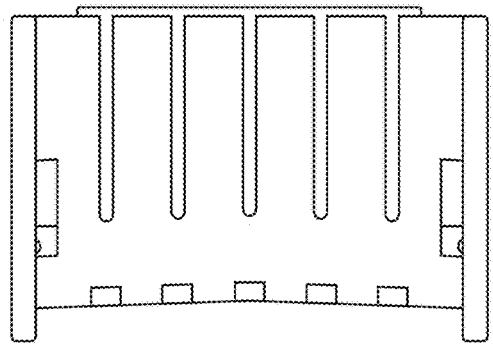
FIG. 3J is a side view of the single-passage bushing of FIG. 3I.
Figure 3K:
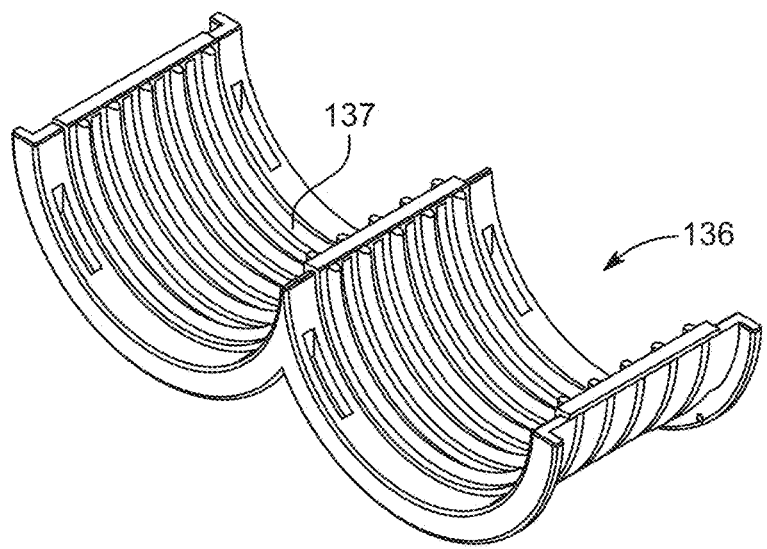
FIG. 3K shows a double-passage bushing of the transverse support member of FIG. 3 in isolation.
Figure 5:
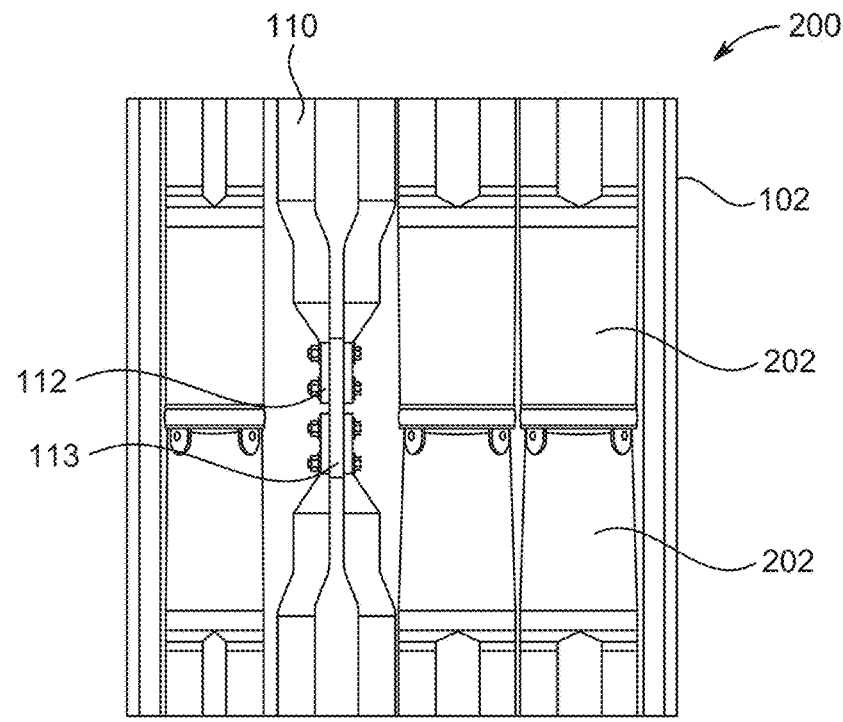
FIG. 5 shows details of an example sealed connection between bus duct sections of a rigid bus duct system according to one embodiment of the present disclosure.
Figure 5A:
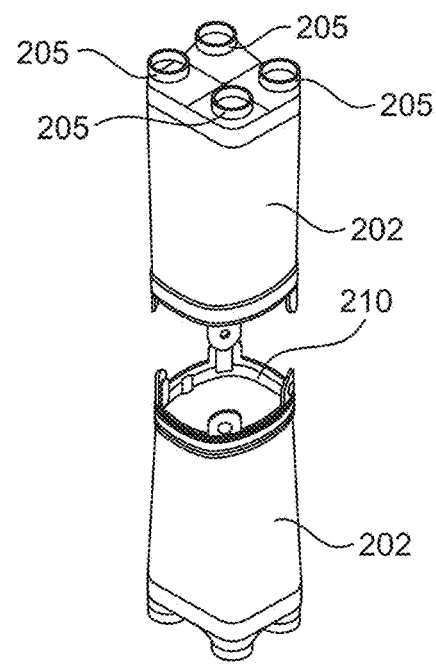
FIG. 5A shows a pair of sealing boots and a retaining ring for sealing a group of conductors according to one embodiment of the present disclosure.
Figure 5B:
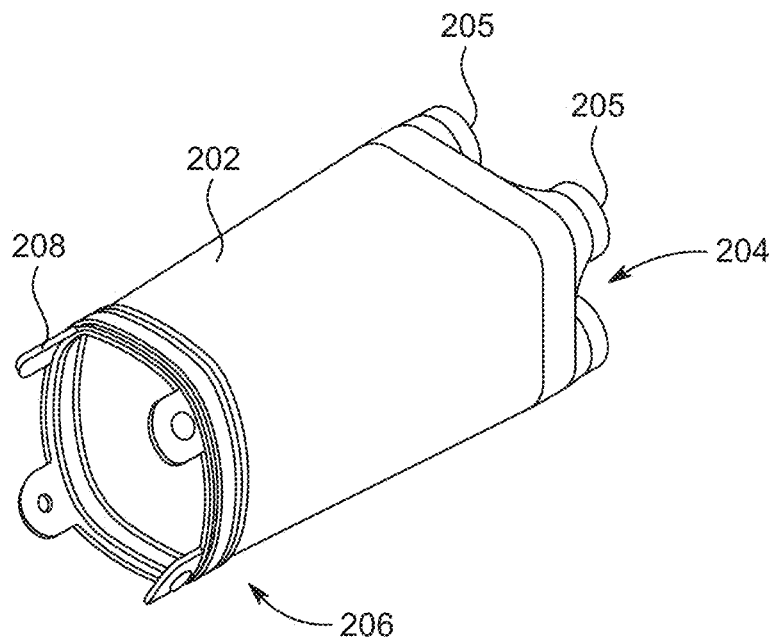
FIG. 5B shows an example sealing boot in isolation.
Figure 5C:
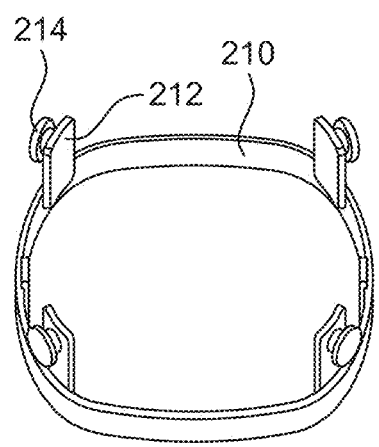
FIG. 5C shows an example retaining ring in isolation.

FIGS. 3 to 3J show features of an example transverse support member 130 for a rigid bus duct according to one embodiment of the present disclosure. The support member 130 comprises a central block 131 and two top/bottom blocks 132, which are bolted together (see FIG. 3G) to form the passages for receiving the insulated conductors. The blocks 131 and 132 are pressed together along interfacial surfaces thereof, and the passages are defined by semicircular "cutout" features (although blocks 131 and 132 are typically formed by injection molding, so the block material is not cut to form the features) along the interfacial surfaces. In the illustrated embodiments, each passage for holding the neutral conductors, and the conductors on the edges of the high current phase groups are formed by a pair of single-passage features 133, and the passages for adjacent conductors of different high current phase groups are formed by a pair of double-passage features 134. The single-passage and double-passage features 133 and 134 of the blocks 131/132 are configured to receive single-passage and double-passage inserts or bushings 135 and 136. The sizes of the bushings 135 and 136 can be varied to accommodate insulated conductors of different diameters in some embodiments. The bushings 135 and 136 may each comprise a hard plastic body with a plurality of rubber sealing strips 137 along the inner surface thereof.

Figure 7C:
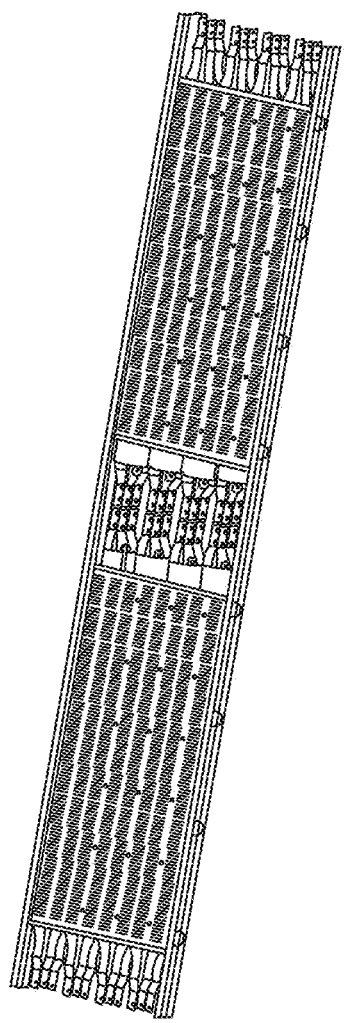
Figure 7D:
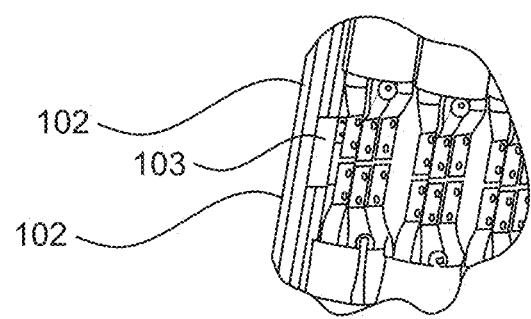
Figure 7E:
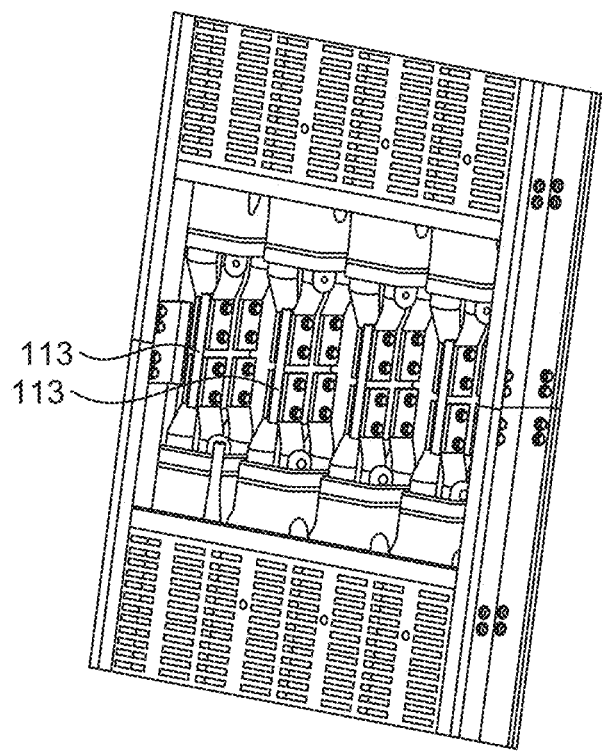
Figure 7F:
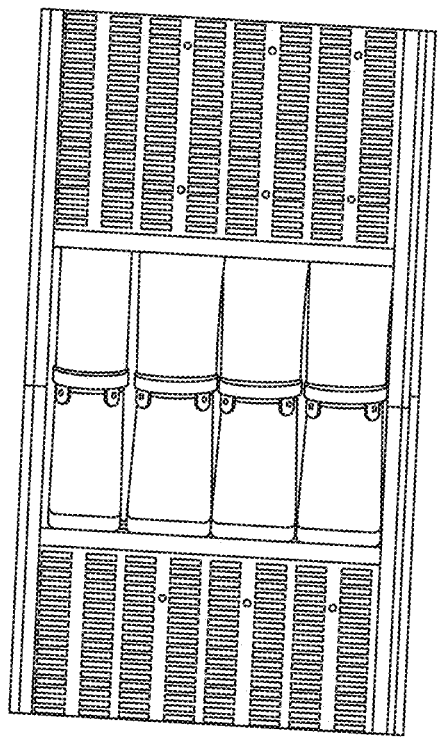
Figure 7G:
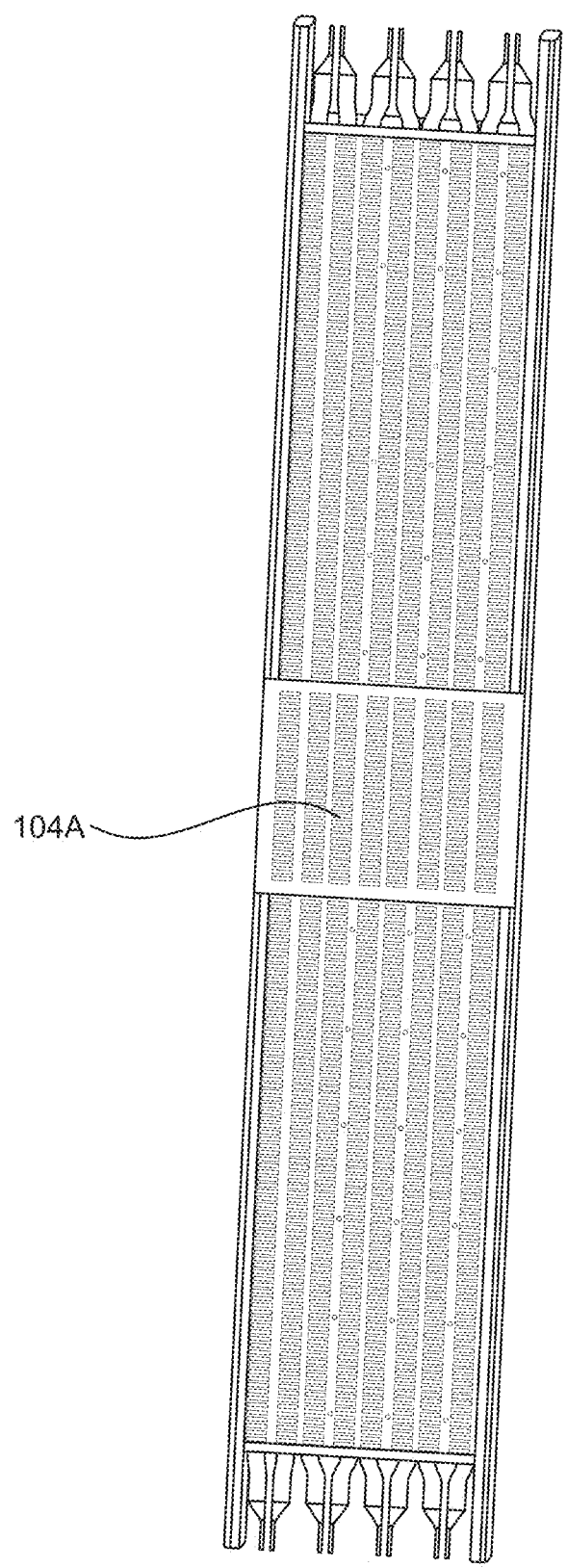

FIGS. 5, 5A, 5B and 5C show details of an example sealed connection 200 between bus duct sections of a rigid bus duct system according to one embodiment of the present disclosure comprising a pair of sealing boots 202 constructed from a flexible, insulating material, surrounding the connection between each group of insulated conductors 110. The rails 102 of the sections 100 have covers (not shown in FIG. 5) extending therebetween, and may be connected to each other using splice plates (see e.g. FIG. 7D), as discussed below. One pair of boots 202 is removed in FIG. 5 to show the connection between conductors within the same group, which is effected by bolting or otherwise securing the lugs 112 at the ends of the conductors 110 to a conducting strip 113. The boots 202 cover the lugs 212 and any other uninsulated portions at the ends of insulated conductors 110. Each boot 202 has a first end 204 with a generally rectangular cross section (with rounded corners) to conform to the pattern of the insulated conductors 110 in the group, and an open second end 206 with a more rounded cross section such that the second end 206 can snugly fit over the second end 206 of another boot 202 and form a seal therewith. The first end 204 is closed other than four openings 205 at the corners thereof, with each opening 205 sized to snugly fit over the insulated portion of an insulated conductor 110. The second end 206 also comprises tabs 208 with holes for engaging a retaining ring 210. The retaining ring 210 is constructed from a more rigid material than boots 202, and comprises tabs 212 having protrusions 214 for engaging the holes in the tabs 208 of a boot 202. One retaining ring 210 is used to secure each pair of boots 202, with the ring placed inside a first one of the boots 202 and secured to the holes in the tabs 208, and the second end 206 of the second boot 202 is stretched over the second end 206 of the first boot 202. When installed vertically, the ring 210 is placed within the lower boot 202, and the second end 206 of the upper boot 202 is stretched over the lower boot 202.

Figure 6A:
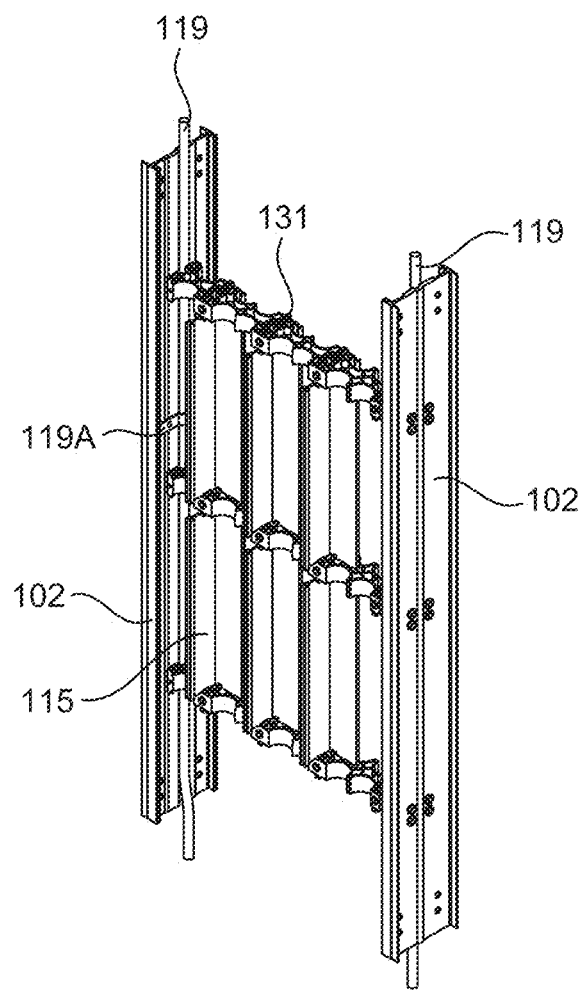
FIGS. 6A-6H show steps of an example method for assembling a rigid bus duct section according to one embodiment of the present disclosure.
Figure 6B:
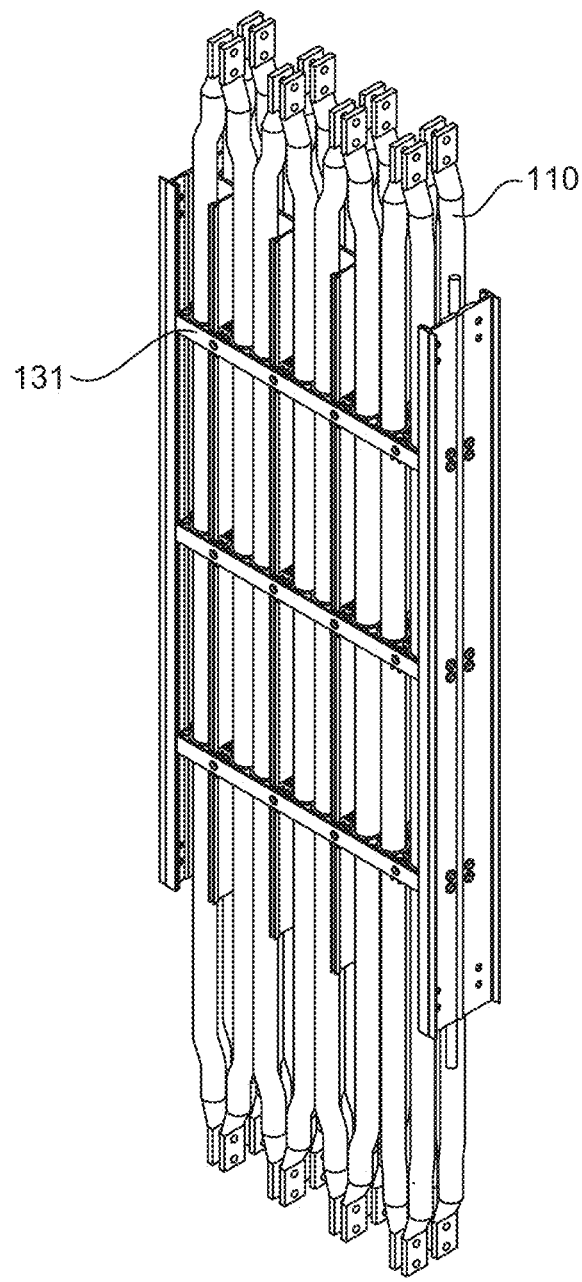
Figure 6C:
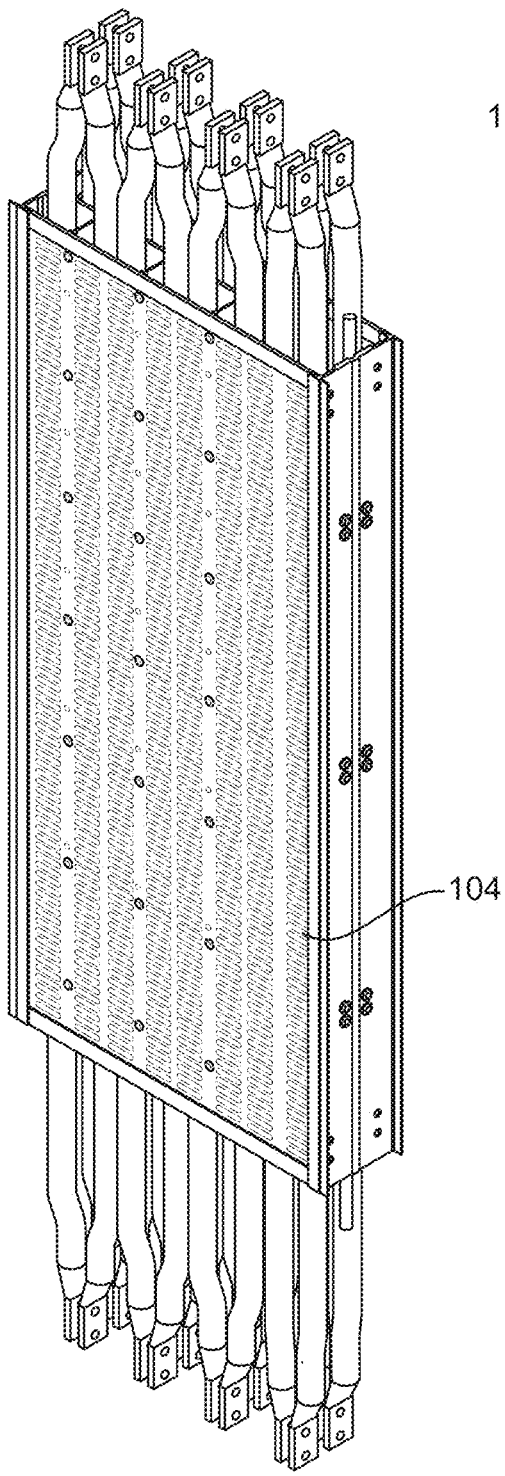
Figure 6D:
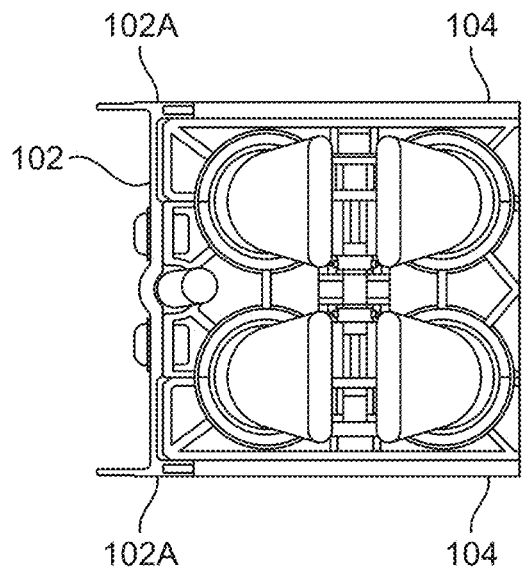
Figure 6E:
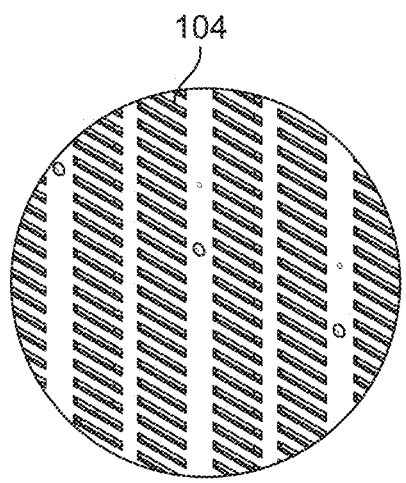
Figure 6F:
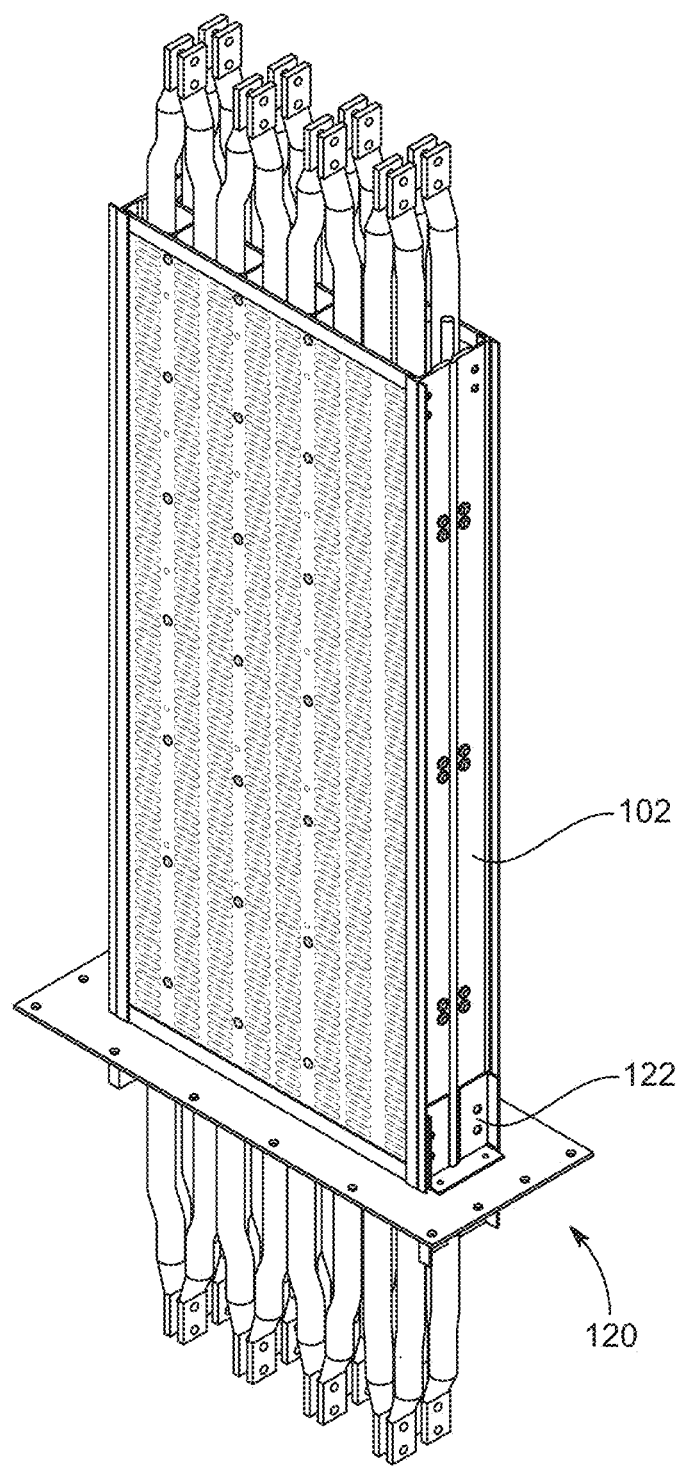
Figure 6G:
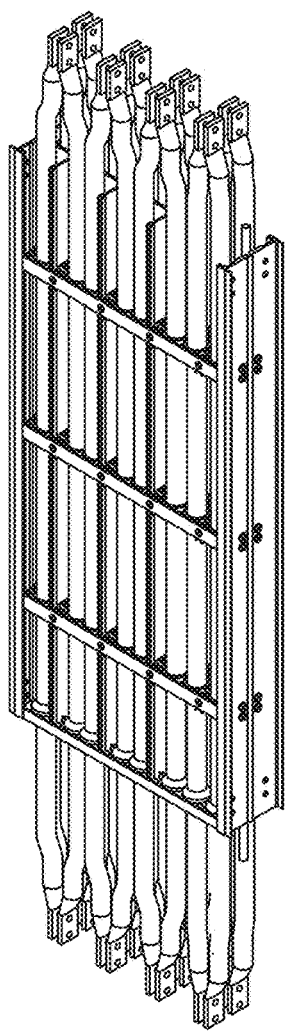
Figure 6H:
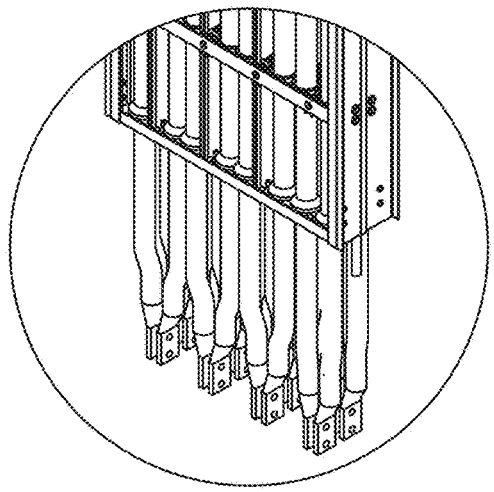

FIGS. 6A-6F show steps of a method of assembling a rigid bus duct section according to one embodiment of the present disclosure. As shown in FIG. 6A, the rails 102 are secured to opposed transverse sides of central blocks 131 (with bushings 135 and 136 installed therein) of the support members, with three shielding structures 115 held in place between each adjacent pair of central blocks 131. Ground cables 119 may be secured to the insides of the side rails, for example by ground clamps 119A, prior to the rails 102 being connected to the central blocks 131. The rails 102 may be secured to the central blocks 131, for example, by bolts received in square nuts held in place in in a press fit manner in chambers on the transverse sides of the central blocks 131 (as seen in FIG. 3B). After all of the shielding structures 115 and central blocks 131 are in place, the insulated conductors 110 are placed in position and secured in place by top/bottom blocks 132 (with bushings 135 and 136 installed therein), as shown in FIG. 6B. The top/bottom blocks 132 may be secured to the central blocks 131, for example, by bolts received in square nuts held in place in in a snap fit manner in chambers in central portions of the central blocks 131 (as seen in FIG. 3C). Next, the covers 104 extending across the space between rails 102, are installed as shown in FIG. 6C. The covers 104 are installed by sliding the edges thereof into grooves 102A formed in the flanges of the rails 102, as best seen in FIG. 6D. As shown in FIG. 6E, the covers 104 may be secured by bolts 105 that are received in threaded connections 117 in the shielding structures 115. In the illustrated example, the bus duct section is to be secured through a hole in the floor of a building, and a floor seal assembly 120 is connected to one end of the bus duct section by bolting the rails 102 to stubs 122, as shown in FIG. 6F. In implementations where the bus duct section is to continue extending below the floor, the side rails and support blocks for the "bottom" portion (not shown in FIG. 6F) would be attached in place around the conductors 110 after the floor seal assembly 120 is in place. The other end of the bus duct section may be connected to a junction box, or directly to another bus duct section by means of a sealed connection. As one of skill in the art will appreciate, the conductors 110 can be longer or shorter depending on whether the bottom portion is going to connect to directly another bus duct section (e.g. through a sealed connection), or to a junction box. In some embodiments, where an end of the bus duct section is to be connected to a junction box, a seal block 123 may be installed at the end thereof, as shown in FIGS. 6G and 6H. In some embodiments, each bus duct section is pre-assembled off-site then shipped to a work site for installation (e.g. by dropping a pre-assembled bus duct section through a hole in a floor, securing the floor seal assembly 120 to the floor and connecting the conductors 110 to corresponding conductors other bus duct sections, to junctions boxes, or to other components as needed for the desired implementation).

FIG. 7 shows a rigid bus duct section 100A configured for making a sealed connection to another rigid bus duct section according to one embodiment of the present disclosure. In the FIG. 7 example, the side rails 102 and conductors 110 all have the same length, for facilitating sealed connections at both ends, but it is to be understood that in some embodiments the conductors 110 may extend past the rails at one end of the section where a direct sealed connection to another bus duct section is not desired (e.g. where one end is to be attached to a junction box). FIG. 7A shows two bus duct sections 100A of the type shown in FIG. 7, with a plurality of sealing boots 202 installed over the conductors 110. The boots 202 for the neutral group have a slightly different shape to accommodate the spacing of the conductors 110 in the neutral group (which is different from that of the high current phase groups as discussed above), and in some embodiments the boots 202 for the neutral group may be a different color than the boots 202 for the high current phase groups. As best seen in FIG. 7B, retaining rings 210 are placed within the boots 202 of one of the sections 100A (the lower section in vertical installations). As shown in FIGS. 7C and 7D, with the boots in place over the conductors, the rails 102 of the two sections 100A are connected to each other by splice plates 103. The splice plates 103 also firmly clamp the ground cables 119 to the rails 102. Next, as shown in FIG. 7E, the lugs 112 of the conductors 110 of each group are connected to a conducting strip 113, then the lower boots are slid up and the upper boots are slid down overtop of the lower boots, as shown in FIG. 7F. Finally, a connection cover 104A is placed overtop of the connection area, as shown in FIG. 7G (another connection cover 104A may be installed on the reverse side).

Figure 8:
FIG. 8 shows two rigid bus duct sections coupled side by side according to one embodiment of the present disclosure.
Figure 8A:
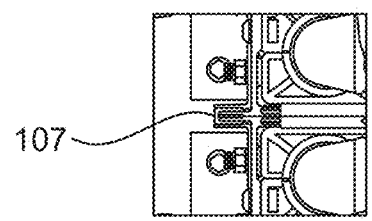
FIG. 8A shows an end view of the connection between side rails of two adjacent rigid bus duct sections according to one embodiment of the present disclosure.
Figure 8B:
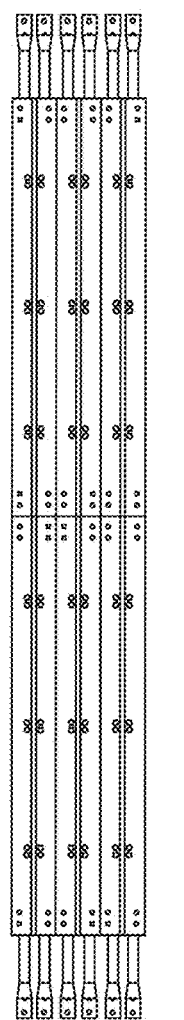
FIG. 8B shows three rigid bus duct sections coupled side by side according to one embodiment of the present disclosure.
Figure 8C:
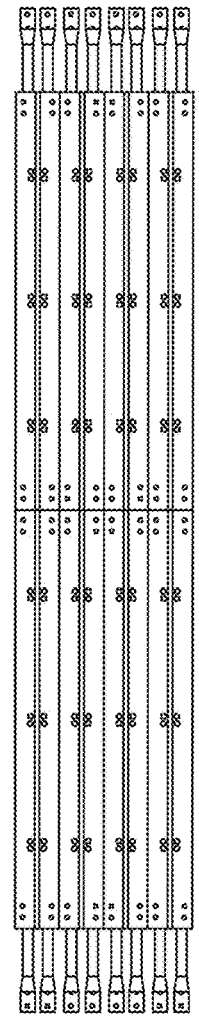
FIG. 8C shows four rigid bus duct sections coupled side by side according to one embodiment of the present disclosure.
Figure 8D:
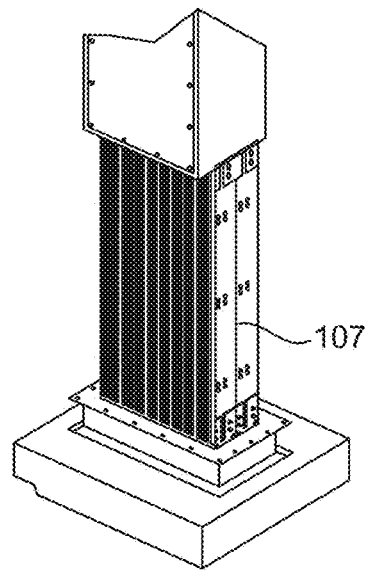
FIG. 8D shows an example floor seal and an example tap box configured to accommodate two rigid bus duct sections coupled side by side according to one embodiment of the present disclosure.

Bus duct sections according to the present disclosure may thus be connected end to end to form a straight run of any desired length. The bus duct sections disclosed herein are also designed to be modular, with sections (which may also sometimes be referred to as "cassettes") stacked side by side to deliver any desired amount of electrical power. For example, FIG. 8 shows a "two-cassette" bus duct system wherein two pairs of end-to-end connected sections are stacked side by side. The cassettes may be held together by a rail clamp 107 that engages the outside flanges of the rails 102, as shown in FIGS. 8A and 8D. In this manner any number of sections can be stacked together, as illustrated in FIGS. 8B and 8C which respectively show three-cassette and four-cassette but duct systems. When using a multi-cassette configuration, any floor seal assemblies or junction boxes would need to be corresponding adjusted to accommodate the stack of bus duct sections. For example, FIG. 8D shows an example floor seal and an example tap box configured to accommodate two rigid bus duct sections coupled side by side according to one embodiment of the present disclosure.

Figure 9:
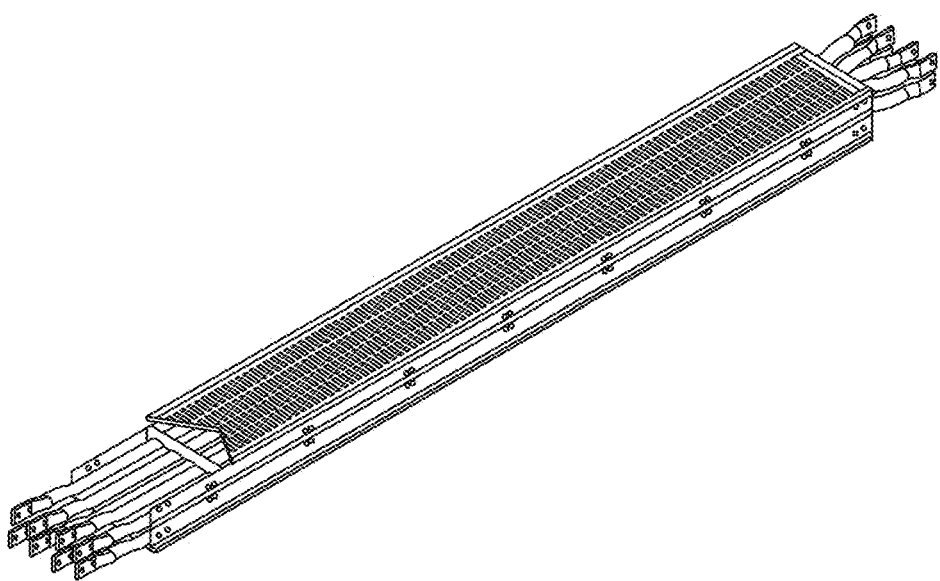
FIG. 9 shows an example rigid bus duct section having a smaller number of conductors according to one embodiment of the present disclosure.
Figure 9A:
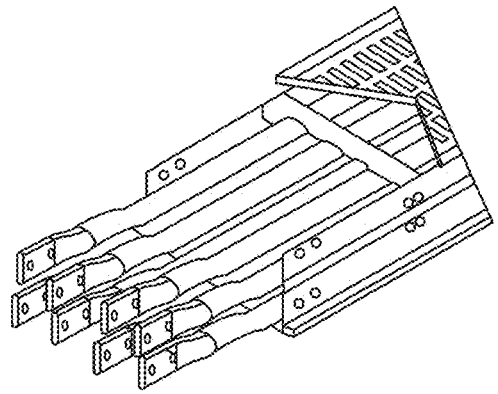
FIG. 9A is an enlarged view of area A of FIG. 9.
Figure 9B:
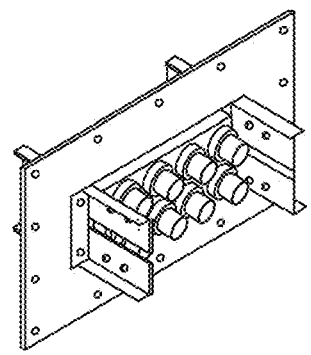
FIG. 9B shows an example floor seal assembly for the rigid bus duct section of FIG. 9.
Figure 10A:
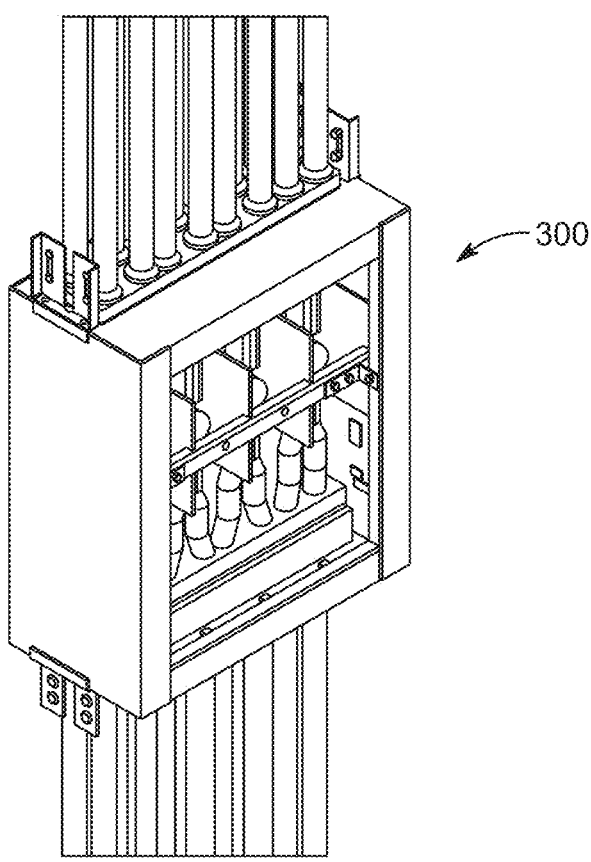
FIGS. 10A-10E show example junction boxes for connecting to bus duct sections according to embodiments of the present disclosure.
Figure 10B:
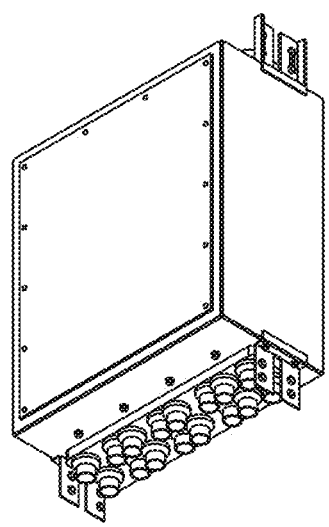
Figure 10C:
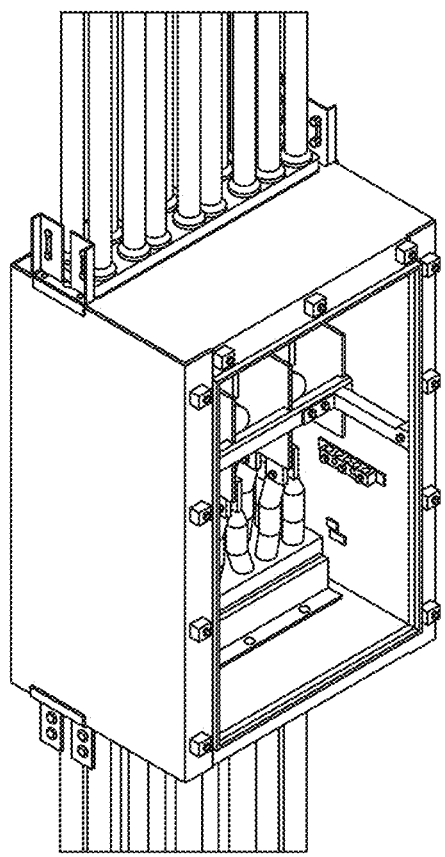
Figure 10D:
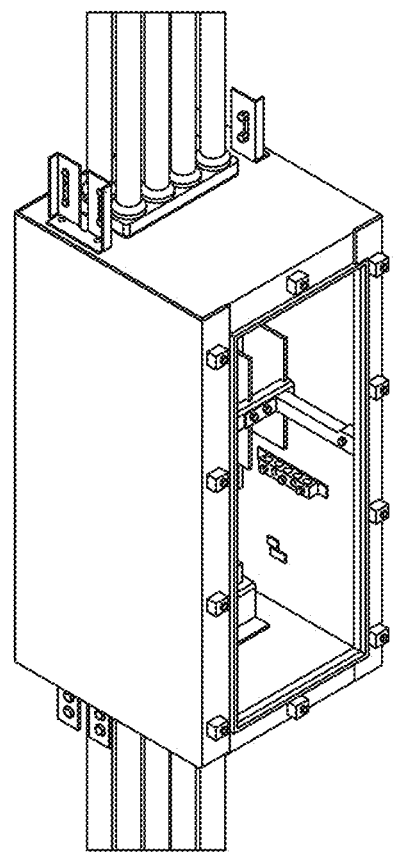
Figure 10E:
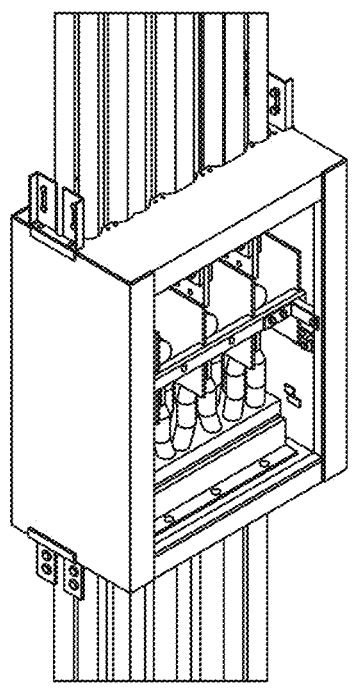

In some embodiments, bus duct sections may be configured to have fewer conductors than the examples discussed above, such as for example when lower power requirements are needed. For example, FIGS. 9 and 9A show an example rigid bus duct section having only eight conductors 110, arranged in two rows of four conductors. FIG. 9B shows an example floor seal assembly for the rigid bus duct section of FIG. 9.

In some embodiments, bus duct sections according to the present disclosure are configured to connect to junction boxes, as discussed above. FIGS. 10A-10E show example junction boxes for connecting to bus duct sections according to embodiments of the present disclosure. The junction boxes may be configured to accommodate the desired electrical connections, for example by including bus bars for connecting the conductors to, and comprise lugs for connecting to the rails 102, similar to lugs 122 of floor seal assembly 120. The junction boxes may also comprise seal blocks for receiving the conductors.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A rigid bus duct comprising:
a pair of side rails extending in a longitudinal direction;
a plurality of support members extending between the side rails in a transverse direction;
a plurality of insulated conductors extending longitudinally, and held in a fixed relationship to one another by the plurality of support members, wherein the plurality of insulated conductors are arranged in groups including a plurality of high current phase groups and a neutral group; and,
a plurality of shielding structures connected between the support members and positioned with at least one shielding structure located within each high current phase group, each shielding structure comprising an elongated element constructed from an electrically conductive material and having a cross-section comprising a plurality of arms, and positioned such that one of the plurality of arms extends between each adjacent pair of insulated conductors of that high current phase group.

2. The rigid bus duct of claim 1 wherein the insulated conductors comprise hollow tubes.

3. The rigid bus duct of claim 2 comprising sixteen insulated conductors held within passages through the support members arranged in two rows of eight, with each high current phase group and the neutral group comprising two adjacent pairs of insulated conductors, and wherein each shielding structure has a cross-shaped cross-section.

4. The rigid bus duct of claim 3 wherein a center-to-center spacing between two adjacent passages in the same row for holding insulated conductors of the same high current phase group is greater than a center-to-center spacing between two adjacent passages in the same row for holding insulated conductors of different high phase groups.

5. The rigid bus duct of claim 4 wherein each shielding structure comprises an extruded elongated element constructed from an electrically conducting material and having a generally cross-shaped cross section.

6. The rigid bus duct of claim 5 wherein the shielding structures are held in place between the support members by engagement features formed on opposed faces of each support member.

7. The rigid bus duct of claim 6 comprising a pair of covers extending between the side rails to form an enclosure enclosing the support members, insulated conductors, and shielding structures, wherein each cover is held in place by fasteners received in the shielding structures.

8. A rigid bus duct comprising:
a pair of side rails extending in a longitudinal direction;
a plurality of support members extending between the side rails in a transverse direction;
a plurality of insulated conductors extending longitudinally, and held in a fixed relationship to one another by the plurality of support members, wherein the plurality of insulated conductors are arranged in groups including a plurality of high current phase groups and a neutral group;
a plurality of shielding structures connected between the support members and positioned with at least one shielding structure located between the insulated conductors of each high current phase group; and,
a pair of covers extending between the side rails to form an enclosure enclosing the support members, insulated conductors, and shielding structures, wherein each cover is held in place by fasteners received in the shielding structures.

9. A rigid bus duct comprising:
a pair of side rails extending in a longitudinal direction;
a plurality of support members extending between the side rails in a transverse direction;
a plurality of insulated conductors extending longitudinally, and held in a fixed relationship to one another by the plurality of support members, wherein the plurality of insulated conductors are arranged in groups including a plurality of high current phase groups and a neutral group; and,
a plurality of shielding structures connected between the support members and positioned with at least one shielding structure located between the insulated conductors of each high current phase group,
wherein each of the side rails comprises outwardly extending flanges, and wherein the rigid bus duct is connected to another rigid bus duct by a pair of rail clamps engaging the outwardly extending flanges.

10. A rigid bus duct system comprising:
a plurality of bus duct sections, each bus duct section comprising:
a pair of side rails extending in a longitudinal direction,
a plurality of support members extending between the side rails in a transverse direction, and
a plurality of insulated conductors extending longitudinally, and held in a fixed relationship to one another by the plurality of support members,
characterised in that:
each insulated conductor comprises a hollow tube, and the plurality of insulated conductors are arranged in groups including a plurality of high current groups and a neutral group; and
adjacent insulated conductors in different high current phase groups are separated by a smaller distance than adjacent insulated conductors in the same high current phase group.

11. The rigid bus duct system of claim 10 wherein each bus duct section comprises a plurality of shielding structures connected between the support members and positioned with at least one shielding structure located between the insulated conductors of each high current phase group.

12. The rigid bus duct system of claim 11 wherein each bus duct section comprises a pair of covers extending between the side rails to form an enclosure enclosing the support members, insulated conductors, and shielding structures, wherein each cover is held in place by fasteners received in the shielding structures.

13. The rigid bus duct system of claim 12 wherein at least two of the bus duct sections are connected end-to-end by a sealed connection apparatus comprising a pair of sealing boots for each group of insulated conductors, wherein each sealing boot comprises a body constructed from a flexible material and having a closed first end and an open second end, with an opening through the closed end for each insulated conductor such that the open end of one sealing boot of each pair is stretchable over the open end of the other sealing boot of each pair to form a seal around a connection between each group of insulated conductors.

14. The rigid bus duct system of claim 13 wherein each sealing boot comprises a plurality of boot tabs extending from the open end, each boot tab having a hole defined therein, and further comprising a rigid retaining ring comprising a plurality of ring tabs, each ring tab having a protrusion thereon, wherein the retaining ring is inserted into the open end of a first sealing boot and the protrusions are received in the holes in the boot tabs of the first sealing boot, and the open end of a second sealing boot is stretched over the open end of the first sealing boot.

15. Apparatus for forming a sealed connection between two bus duct sections of a rigid bus duct system, wherein each bus duct section comprises a plurality of insulated conductors are arranged in groups including a plurality of high current groups and a neutral group, the apparatus comprising a pair of sealing boots for each group of insulated conductors, wherein each sealing boot comprises a body constructed from a flexible material and having a closed first end and an open second end, with an opening through the closed end for each insulated conductor such that the open end of one sealing boot of each pair is stretchable over the open end of the other sealing boot of each pair to form a seal around a connection between each group of insulated conductors.

16. The apparatus of claim 15 wherein each sealing boot comprises a plurality of boot tabs extending from the open end, each boot tab having a hole defined therein, and further comprising a rigid retaining ring comprising a plurality of ring tabs, each ring tab having a protrusion thereon, wherein the retaining ring is inserted into the open end of a first sealing boot and the protrusions are received in the holes in the boot tabs of the first sealing boot, and the open end of a second sealing boot is stretched over the open end of the first sealing boot.

* * * * *